(12) United States Patent
Jaeger et al.

(10) Patent No.: US 10,696,370 B1
(45) Date of Patent: Jun. 30, 2020

(54) SYSTEMS AND METHODS FOR CONTROLLING PLANETARY TRANSMISSION ARRANGEMENTS FOR MARINE PROPULSION DEVICES

(71) Applicant: Brunswick Corporation, Mettawa, IL (US)

(72) Inventors: Matthew W. Jaeger, Oshkosh, WI (US); Jason F. Pugh, Ripon, WI (US); Randall J. Poirier, Fond du Lac, WI (US); Joseph S. VanSelous, Highland, MI (US); Jiri Jager, Prague (CZ); Karel Fortl, Ceske Budejovice (CZ)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 16/675,922

(22) Filed: Nov. 6, 2019

Related U.S. Application Data

(62) Division of application No. 16/151,419, filed on Oct. 4, 2018, now Pat. No. 10,518,860, which is a division
(Continued)

(51) Int. Cl.
*F16H 63/30* (2006.01)
*B63H 23/02* (2006.01)
(Continued)

(52) U.S. Cl.
CPC .............. *B63H 23/08* (2013.01); *B63H 5/10* (2013.01); *B63H 20/20* (2013.01); *F16H 3/44* (2013.01);
(Continued)

(58) Field of Classification Search
CPC .... B63H 2023/0283; B63H 2023/0291; B63H 20/20; B63H 21/21; F16H 63/3003
See application file for complete search history.

(56) References Cited

U.S. PATENT DOCUMENTS

| 1,619,449 A | 3/1927 | Waters |
| 2,198,397 A | 4/1940 | Szekely |

(Continued)

FOREIGN PATENT DOCUMENTS

| GB | 831058 | 3/1960 |
| GB | 955002 | 4/1964 |

OTHER PUBLICATIONS

Transmission Brake Bands, retrieved from www.freeacestudyguides.com dated Dec. 6, 2010.

*Primary Examiner* — Tisha D Lewis
(74) *Attorney, Agent, or Firm* — Andrus Intellectual Property Law, LLP

(57) ABSTRACT

Transmission systems and methods are for a marine propulsion device having an internal combustion engine that drives a propulsor. An input shaft is driven into rotation at a non-zero first rotational speed by the internal combustion engine. An output shaft drives the propulsor into rotation at a non-zero second rotational speed. A planetary gearset transfers power from the input shaft to the output shaft. A band brake is on the planetary gearset. Actuation of the band brake effects a gear change in the planetary gearset. A band brake actuator actuates the band brake to effect the gear change. A controller controls the band brake actuator. Based upon one or more operational characteristics of the marine propulsion device the controller is programmed to control the band brake actuator so that the second rotational speed is less than the first rotational speed.

10 Claims, 15 Drawing Sheets

Related U.S. Application Data of application No. 14/605,393, filed on Jan. 26, 2015, now Pat. No. 10,124,874.

(51) Int. Cl.

| | | |
|---|---|---|
| *B63H 20/20* | (2006.01) | |
| *B63H 21/21* | (2006.01) | |
| *B63H 23/08* | (2006.01) | |
| *F16H 61/06* | (2006.01) | |
| *F16H 3/44* | (2006.01) | |
| *B63H 5/10* | (2006.01) | |

(52) U.S. Cl.
CPC ... *F16H 61/061* (2013.01); *B63H 2023/0283* (2013.01)

(56) References Cited

U.S. PATENT DOCUMENTS

| | | | |
|---|---|---|---|
| 2,289,991 A | 7/1942 | Paxman | |
| 2,682,934 A | 7/1954 | Howarth | |
| 2,751,799 A | 6/1956 | Long | |
| 2,803,974 A | 8/1957 | Kelley | |
| 2,854,858 A | 10/1958 | Butterfield | |
| 2,867,136 A | 1/1959 | Albinson | |
| 2,883,876 A | 4/1959 | Taylor | |
| 3,019,671 A | 2/1962 | Albinson | |
| 3,025,822 A | 3/1962 | Tenney | |
| 3,164,034 A | 1/1965 | Kelley | |
| 3,261,591 A | 7/1966 | Campbell | |
| 3,392,603 A | 7/1968 | Sanders | |
| 3,395,893 A | 8/1968 | Kumpf | |
| 3,557,911 A | 1/1971 | Ellard | |
| 3,601,226 A | 8/1971 | Masaoka | |
| 3,680,409 A | 8/1972 | Chamberlain | |
| 3,831,401 A | 8/1974 | Hurwitz | |
| 3,977,503 A | 8/1976 | Hurst | |
| 3,994,254 A | 11/1976 | Woodfill | |
| 4,022,308 A | 5/1977 | Hurst | |
| 4,058,189 A | 11/1977 | Chamberlain | |
| 4,351,206 A | 9/1982 | Lemieux | |
| 4,360,092 A | 11/1982 | Muller et al. | |
| 4,504,238 A | 3/1985 | Neisen | |
| 4,676,115 A | 6/1987 | Morscheck et al. | |
| 4,820,209 A | 4/1989 | Newman | |
| 4,850,911 A | 7/1989 | Nakahama | |
| 4,919,009 A | 4/1990 | Newman | |
| 5,018,996 A | 5/1991 | Newman et al. | |
| 5,314,044 A | 5/1994 | Sharp | |
| 5,564,992 A | 10/1996 | Cunningham | |
| 5,588,928 A | 12/1996 | Koivunen | |
| 5,935,041 A | 8/1999 | Tsukamoto et al. | |
| 6,029,785 A | 2/2000 | Koivunen | |
| 6,053,834 A | 4/2000 | Savoyard | |
| 6,062,926 A | 5/2000 | Alexander, Jr. et al. | |
| 6,146,223 A | 11/2000 | Karls et al. | |
| 6,260,671 B1 | 7/2001 | Fujita | |
| 6,350,165 B1 | 2/2002 | Neisen | |
| 6,435,923 B1 | 8/2002 | Ferguson | |
| 6,755,703 B1 | 6/2004 | Erickson | |
| 7,010,911 B2 | 3/2006 | Morise | |
| 7,131,386 B1 | 11/2006 | Caldwell | |
| 7,267,068 B2 | 9/2007 | Bradley et al. | |
| 7,305,928 B2 | 12/2007 | Bradley et al. | |
| 7,387,556 B1 | 6/2008 | Davis | |
| 7,458,866 B2 | 12/2008 | Nakamura | |
| 7,485,020 B2 | 2/2009 | Nakamura | |
| 7,544,110 B1 | 6/2009 | Phillips et al. | |
| 7,561,886 B1 | 7/2009 | Gonring et al. | |
| 7,632,161 B1 | 12/2009 | Waldvogel et al. | |
| 7,891,263 B2 | 2/2011 | Mowbray et al. | |
| 7,942,712 B2 | 5/2011 | Suzuki et al. | |
| 7,997,398 B1 | 8/2011 | Phillips et al. | |
| 8,100,732 B2 | 1/2012 | Nakamura et al. | |
| 8,105,199 B2 | 1/2012 | Okabe | |
| 8,109,800 B2 | 2/2012 | Okabe et al. | |
| 8,118,701 B2 | 2/2012 | Okabe et al. | |
| 8,157,694 B2 | 4/2012 | Nakamura et al. | |
| 8,246,402 B2 | 8/2012 | Okabe et al. | |
| 8,277,270 B2 | 10/2012 | Ryuman | |
| 8,298,025 B2 | 10/2012 | Eichinger | |
| 8,317,556 B2 | 11/2012 | Suzuki et al. | |
| 8,460,041 B2 | 6/2013 | Davis et al. | |
| 8,478,464 B2 | 7/2013 | Arbuckle et al. | |
| 8,777,681 B1 | 7/2014 | McNalley et al. | |
| 8,924,054 B1 | 12/2014 | Arbuckle et al. | |
| 9,248,898 B1 | 2/2016 | Kirchhoff et al. | |
| 9,441,724 B1 | 9/2016 | Pugh | |
| 9,556,806 B1 | 1/2017 | O'Brien et al. | |
| 9,676,463 B1 | 6/2017 | Fortl | |
| 9,759,321 B1 | 9/2017 | Fortl | |
| 9,840,316 B1 * | 12/2017 | Jaszewski | B63H 20/20 |
| 9,919,783 B1 * | 3/2018 | Tuchscherer | B63H 20/20 |
| 9,964,210 B1 * | 5/2018 | Jaszewski | F16H 63/3003 |
| 10,124,874 B1 | 11/2018 | Jaeger et al. | |
| 10,502,312 B1 * | 12/2019 | Jaszewski | F16H 57/0484 |
| 2001/0012810 A1 | 8/2001 | Ohkubo | |
| 2004/0036232 A1 | 2/2004 | Plews | |
| 2006/0016034 A1 | 6/2006 | Nakamura | |
| 2007/0180941 A1 | 8/2007 | Mowbray | |
| 2008/0096713 A1 | 4/2008 | Beson | |
| 2008/0227585 A1 | 9/2008 | Okabe | |
| 2009/0088289 A1 | 4/2009 | Baldwin | |
| 2009/0203489 A1 | 8/2009 | Okabe | |
| 2011/0241306 A1 | 6/2011 | Serkh | |
| 2012/0214636 A1 | 8/2012 | Hart | |
| 2013/0157800 A1 | 6/2013 | Ward et al. | |
| 2013/0267133 A1 | 10/2013 | Davis et al. | |
| 2013/0267134 A1 | 10/2013 | Davis et al. | |
| 2013/0273792 A1 | 10/2013 | Davis et al. | |
| 2014/0038478 A1 | 2/2014 | Foreman | |
| 2014/0045637 A1 | 2/2014 | Dionne | |
| 2014/0259896 A1 | 9/2014 | Oney | |
| 2015/0013486 A1 | 1/2015 | Kubo | |
| 2015/0017847 A1 | 1/2015 | Kubo | |
| 2015/0367924 A1 | 12/2015 | Davis | |
| 2017/0259896 A1 | 9/2017 | Davis | |

* cited by examiner

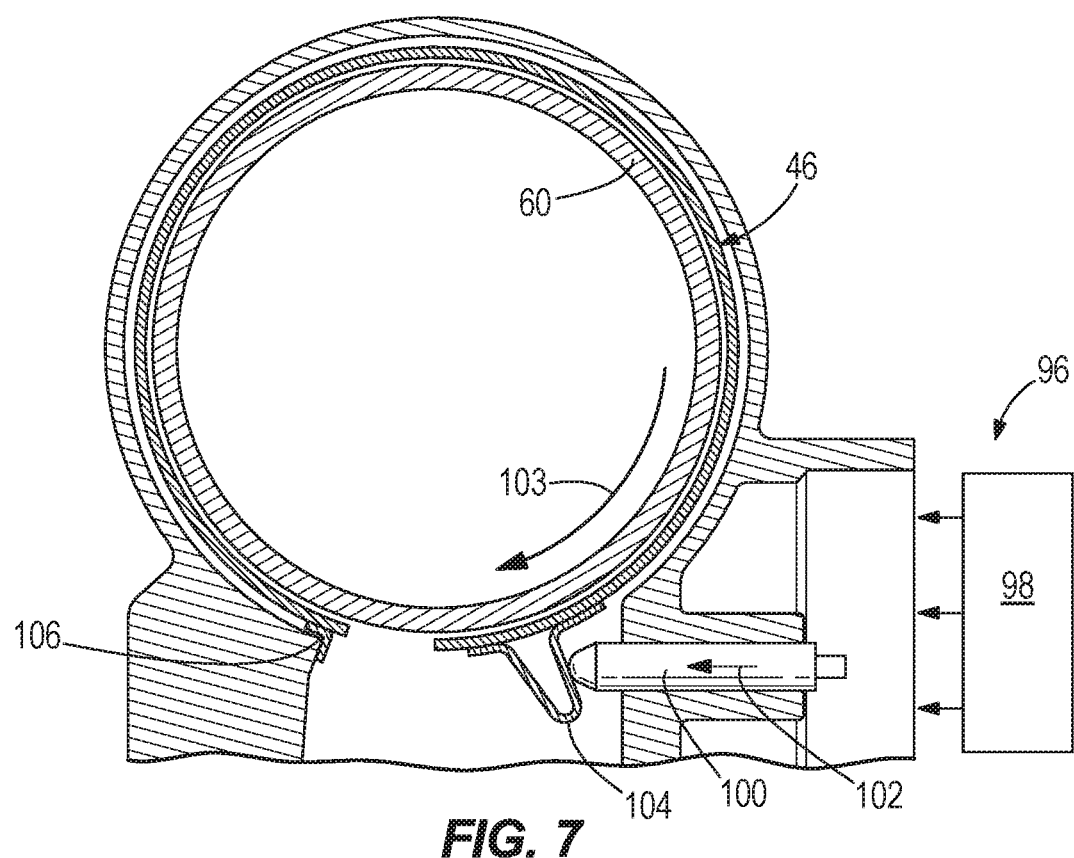
FIG. 7
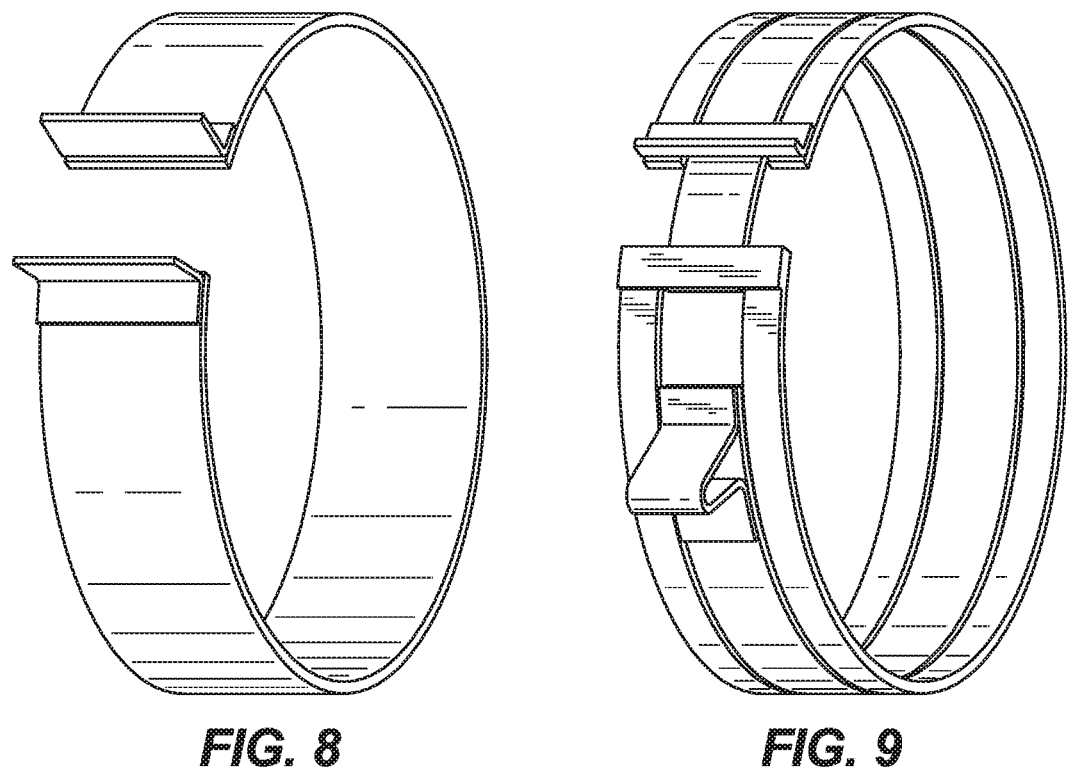
FIG. 8  FIG. 9

SYSTEMS AND METHODS FOR CONTROLLING PLANETARY TRANSMISSION ARRANGEMENTS FOR MARINE PROPULSION DEVICES

CROSS REFERENCE TO RELATED APPLICATION

The present application is a divisional of U.S. application Ser. No. 16/151,419, filed Oct. 4, 2019, which is a divisional of U.S. application Ser. No. 14/605,393, filed Jan. 26, 2015, now U.S. Pat. No. 10,124,874, all of which applications are hereby incorporated by reference in their entirety.

FIELD

The present disclosure relates to marine propulsion devices, and more particularly to transmission arrangements for marine propulsion devices and to systems and methods for controlling transmission arrangements for marine propulsion devices.

BACKGROUND

The following U.S. Patents are incorporated herein by reference:

U.S. Pat. No. 6,350,165 discloses an inboard/outboard powered watercraft that incorporates a transmission in its vertical drive unit for providing two forward speeds plus reverse. The transmission is packaged to fit within the vertical drive unit by incorporating a bevel gear apparatus. In one embodiment, the transmission also includes a planetary gear apparatus together with two hydraulic clutches and a ring gear brake. In a second embodiment, three hydraulic clutches are utilized with bevel gears alone to provide the two forward and reverse speeds.

U.S. Pat. No. 6,435,923 discloses a two-speed transmission with reverse gearing for a watercraft. The transmission is disposed in the gimbal housing passing through the transom of the watercraft. A pair of planetary gears share a common ring gear to provide both forward-reverse and first-second gearing in a very compact package. The transmission housing may be formed in two portions, a first housing containing the forward-reverse gear mechanisms and a second housing containing the first-second gear mechanism. The transmission output shaft is connected to the drive shaft of a vertical drive unit by a double universal joint that may be replaced without disassembling the transmission components.

U.S. Pat. No. 7,891,263 discloses a two speed transmission system mounted for driving a marine craft. The transmission system comprises an input shaft coupled in direct connection with a driveshaft of an engine of the marine craft; an output shaft coaxial with the input shaft coupled in direct connection with a driveline of the marine craft; a first gear train for transmitting drive at a fixed first gear ratio; a second gear train for transmitting drive at a fixed second gear ratio; a first friction clutch operable to engage/disengage the first gear train; and a second friction clutch operable to engage/disengage the second gear train. Shifting between the first gear ratio and the second gear ratio one of the friction clutches is disengaged using controlled slippage while the other friction clutch is engaged using controlled slippage.

U.S. Pat. No. 7,942,712 discloses an outboard motor that includes a power source, a boat propulsion section, a shift position switching mechanism, a clutch actuator, and a control device. The shift position switching mechanism switches among a first shift position in which a first clutch is engaged and a second clutch is disengaged, a second shift position in which the first clutch is disengaged and the second clutch is engaged, and a neutral position in which both the first clutch and the second clutch are disengaged. When a gear shift is to be made from the first shift position to the second shift position, the control section causes the clutch actuator to gradually increase an engagement force of the second clutch. The outboard motor reduces the load to be applied to the power source and the power transmission mechanism at the time of a gear shift in a boat propulsion system including an electronically controlled shift mechanism.

U.S. Pat. No. 8,109,800 discloses a transmission device that includes hydraulic type transmission mechanisms arranged to change the speed or the direction of rotation of an engine, and hydraulic pressure control valves arranged to control hydraulic pressure supplied to the hydraulic type transmission mechanisms. The hydraulic pressure control valves are disposed on one side or the other side in the watercraft width direction. The transmission device provides an outboard motor capable of securing cooling characteristics of a hydraulic pressure control valve without incurring complexity in structure and increase in cost.

U.S. Pat. No. 8,157,694 discloses an outboard motor having a power transmission mechanism for transmitting power of an engine to a propeller. The power transmission mechanism has a transmission ratio changing unit having a planetary gear train including a sun gear, planetary gears, and an internal gear. The internal gear is connected to an input side shaft on the engine side. The planetary gears are connected to an output side shaft on the propeller side. The sun gear is connected to a stationary portion via a one-way clutch. The planetary gears and the internal gear and/or the sun gear are connected by an on-off clutch. When the on-off clutch is disengaged, the one-way clutch is engaged and the speed from the input side shaft is outputted from the output side shaft with a reduced speed. When the on-off clutch is engaged, the speed from the input side shaft is outputted from the output side shaft with the same speed.

U.S. Pat. No. 8,277,270 discloses a boat propulsion unit that includes a power source, a propeller, a shift position switching mechanism, a control device, and a retention switch. The propeller is driven by the power source to generate propulsive force. The shift position switching mechanism has an input shaft connected to a side of the power source, an output shaft connected to a side of the propeller, and clutches that change a connection state between the input shaft and the output shaft. A shift position of the shift position switching mechanism is switched among forward, neutral, and reverse by engaging and disengaging the clutches. The control device adjusts an engagement force of the clutches. The retention switch is connected to the control device. When the retention switch is turned on by an operator, the control device controls the engagement force of the clutches to retain a hull in a predefined position. The boat propulsion unit provides a boat propulsion unit that can accurately retain a boat at a fixed point.

U.S. Pat. No. 8,317,556 discloses a boat propulsion system that includes a power source, a propulsion section, a shift position switching mechanism arranged to switch among a first shift position, a second shift position, and a neutral position, a gear ratio switching mechanism, an actuator, and a control section. When switching is to be performed from the neutral position to the first shift position and the high-speed gear ratio, the control section is arranged to cause the actuator to, maintain the low-speed gear ratio, switch to the first shift position, and then establish the high-speed gear ratio when the current gear ratio of the gear ratio switching mechanism is the low-speed gear ratio, and cause the actuator to establish the low-speed gear ratio before switching to the first shift position, switch to the first shift position, and then establish the high-speed gear ratio when the current gear ratio of the gear ratio switching mechanism is the high-speed gear ratio. This arrangement improves the durability of a power source and a power transmission mechanism in a boat propulsion system including an electronically controlled shift mechanism.

U.S. Pat. No. 9,676,463 discloses a transmission for a marine propulsion device having an internal combustion engine that drives a propulsor for propelling a marine vessel in water. An input shaft is driven into rotation by the engine. An output shaft drives the propulsor into rotation. A forward planetary gearset that connects the input shaft to the output shaft so as to drive the output shaft into forward rotation. A reverse planetary gearset that connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse gear wherein the reverse planetary gearset drives the output shaft into the reverse rotation.

U.S. Pat. No. 9,248,898 discloses a system that controls the speed of a marine vessel including first and second propulsion devices that produce first and second thrusts to propel the marine vessel. A control circuit controls orientation of the first and second propulsion devices about respective steering axes to control directions of the first and second thrusts. A first user input device is moveable between a neutral position and a non-neutral detent position. When a second user input device is actuated while the first user input device is in the detent position, the control circuit does one or more of the following so as to control the speed of the marine vessel: varies a speed of a first engine of the first propulsion device and a speed of a second engine of the second propulsion device; and varies one or more alternative operating conditions of the first and second propulsion devices.

U.S. Pat. No. 9,556,806 discloses a system for controlling a rotational speed of a marine internal combustion engine having a first operator input device for controlling a speed of the engine in a trolling mode, in which the engine operates at a first operator-selected engine speed so as to propel a marine vessel at a first non-zero speed. A second operator input device controls the engine speed in a non-trolling mode, in which the engine operates at a second operator-selected engine speed so as to propel the marine vessel at a second non-zero speed. A controller is in signal communication with the first operator input device, the second operator input device, and the engine. In response to an operator request to transition from the trolling mode to the non-trolling mode, the controller determines whether to allow the transition based on the second operator-selected engine speed and a current engine speed.

U.S. Pat. No. 7,267,068 discloses a marine vessel maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 7,561,886 discloses a method provided by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

U.S. Pat. No. 8,478,464 discloses systems and methods for orienting a marine vessel so as to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

U.S. Pat. No. 8,777,681 discloses systems for maneuvering a marine vessel that comprise a plurality of marine propulsion devices that are movable between an aligned position to achieve of movement of the marine vessel in a longitudinal direction and/or rotation of the marine vessel with respect to the longitudinal direction and an unaligned position to achieve transverse movement of the marine vessel with respect to the longitudinal direction. A controller has a programmable circuit and controls the plurality of marine propulsion devices to move into the unaligned position when a transverse movement of the marine vessel is requested and to thereafter remain in the unaligned position after the transverse movement is achieved. Methods of maneuvering a marine vessel comprise requesting transverse movement of the marine vessel with respect to a longitudinal direction and operating a controller to orient a plurality of marine propulsion devices into an unaligned position to achieve the transverse movement, wherein the plurality of marine propulsion devices remain in the unaligned position after the transverse movement is achieved.

U.S. Pat. No. 8,924,054 discloses systems and methods for orienting a marine vessel having a marine propulsion device. A control circuit controls operation of the marine propulsion device. A user input device inputs to the control circuit a user-desired global position and a user-desired heading of the marine vessel. The control circuit calculates a position difference between the user-desired global position and an actual global position of the marine vessel and controls the marine propulsion device to minimize the position difference. The control circuit controls the marine propulsion device to orient an actual heading of the marine vessel towards the user-desired global position when the position difference is greater than a threshold. When the position difference is less than the threshold, the control circuit controls the marine propulsion device to minimize a difference between the actual heading and the user-desired heading while minimizing the position difference.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples, transmission systems are for a marine propulsion device having an internal combustion engine that drives a propulsor. An input shaft is driven into rotation at a non-zero first rotational speed by the internal combustion engine. An output shaft drives the propulsor into rotation at a non-zero second rotational speed. A planetary gearset transfers power from the input shaft to the output shaft. A band brake is on the planetary gearset. Actuation of the band brake effects a gear change in the planetary gearset between (1) a neutral gear wherein rotation of the input shaft does not cause rotation of the output shaft and (2) at least one of a forward gear wherein rotation of the input shaft causes forward rotation of the output shaft and a reverse gear wherein rotation of the input shaft causes reverse rotation of the output shaft. A band brake actuator actuates the band brake to effect the gear change. A controller controls the band brake actuator. Based upon one or more operational characteristics of the marine propulsion device the controller is programmed to control the band brake actuator so that the second rotational speed is less than the first rotational speed. Corresponding methods for controlling transmission systems are provided.

BRIEF DESCRIPTION OF THE DRAWINGS

The present disclosure is described with reference to the following Figures. The same numbers are used throughout the Figures to reference like features and like components.

FIG. 7 is a top view of a brake for the transmission.

FIG. 8 is a perspective view of a band brake for the transmission.

FIG. 9 is a perspective view of another type of band brake for the transmission.

DETAILED DESCRIPTION OF THE DRAWINGS

Figure 1:
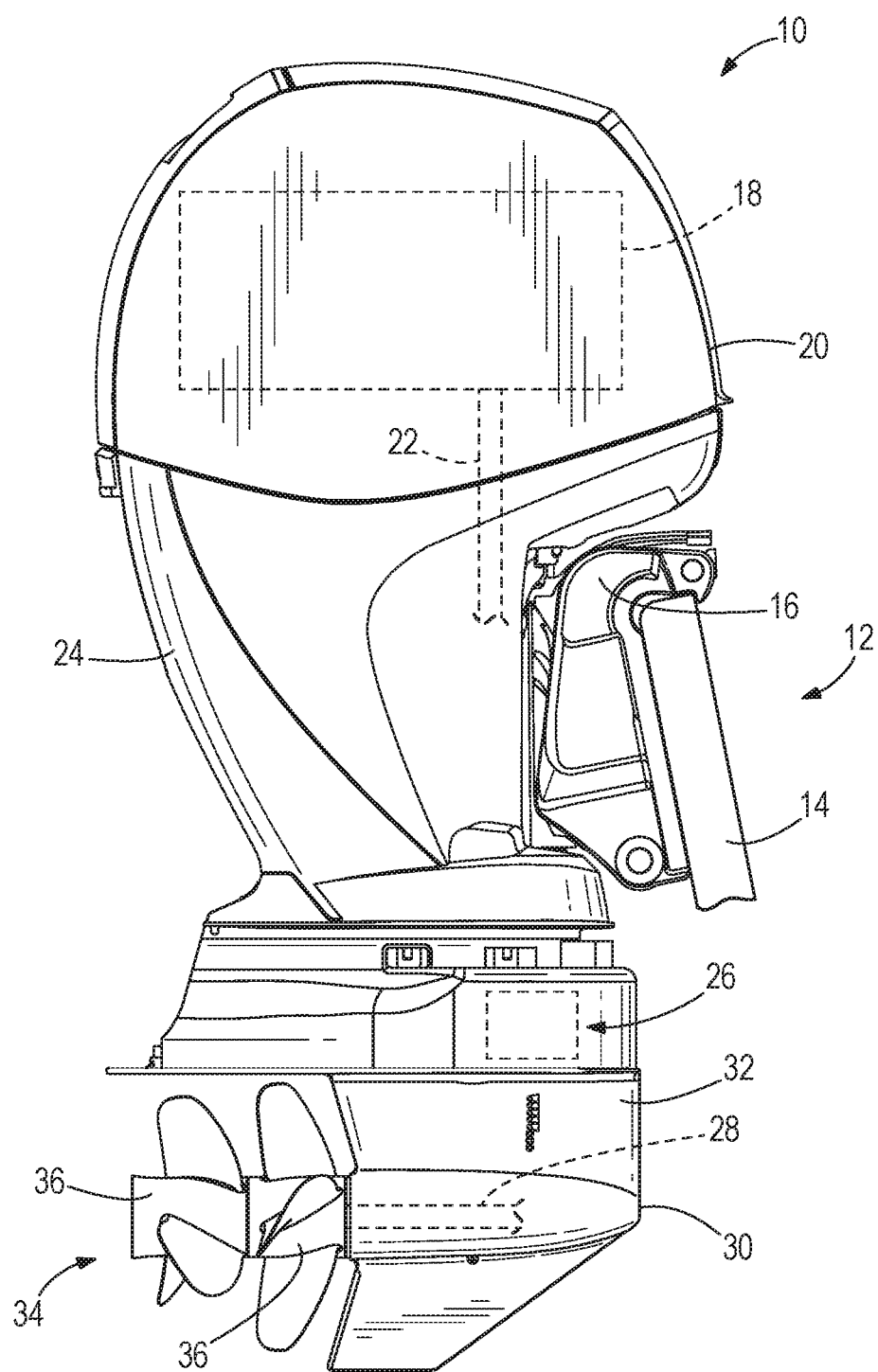
FIG. 1 is a side view of an outboard marine propulsion device.

FIG. 1 depicts an outboard marine propulsion device 10 for propelling a marine vessel 12 in water. The outboard marine propulsion device 10 is connected to the transom 14 of the marine vessel 12 by a transom bracket 16. As is conventional, the outboard marine propulsion device 10 includes an internal combustion engine 18 located within an upper cowling 20. The engine 18 causes rotation of a drive shaft 22 that extends downwardly from the engine 18 through a drive shaft housing 24. A transmission 26 relays rotational force from the drive shaft 22 to a propulsor shaft 28 located in a propulsor shaft housing 30. The transmission 26 is located in or above a gearcase housing 32, which is disposed beneath the drive shaft housing 24. Rotation of the propulsor shaft 28 causes rotation of a propulsor 34, which in this example includes counter rotating propellers 36. The type of propulsor 34 can vary from that which is shown, and in other examples can include single or multiple propellers or single or multiple impellers, and/or the like.

Embodiments of the transmission 26 are shown in FIGS. 2-12. Referring to FIGS. 2-6, the transmission 26 includes an input shaft 38 that is driven into rotation by the engine 18. The input shaft 38 can be the drive shaft 22 or an extension of the drive shaft 22 such that rotation of the drive shaft 22 causes concurrent rotation of the input shaft 38. The transmission 26 also includes an output shaft 40 that is connected to the propulsor shaft 28 via for example a conventional gearset (not shown) such that rotation of the output shaft 40 causes concurrent rotation of the propulsor shaft 28. The input shaft 38 and output shaft 40 are connected together by forward and reverse planetary gearsets 42, 44 such that the input shaft 38 and output shaft 40 are coaxially aligned.

As will be described in more detail herein below, the forward planetary gearset 42 connects the input shaft 38 to the output shaft 40 so as to drive the output shaft 40 into forward rotation. The reverse planetary gearset 44 connects the input shaft 38 to the output shaft 40 so as to drive the output shaft 40 into reverse rotation. The forward and reverse planetary gearsets 42, 44 both provide the same speed reduction from the input shaft 38 to the output shaft 40. In one non-limiting example, the nominal reduction is 1.68:1. A forward brake 46 engages the forward planetary gearset 42 in forward gear so as to drive the output shaft 40 into the forward rotation. A reverse brake 48 engages the reverse planetary gearset 44 in reverse gear so as to drive the output shaft 40 into the reverse rotation. Actuation of neither of the forward brake 46 and reverse brake 48 actuates a neutral gear wherein the output shaft 40 is disconnected from the input shaft 38.

Referring to FIGS. 3-6, the forward planetary gearset 42 includes a forward ring gear 50 that is fixed to and rotates with the input shaft 38. The forward ring gear 50 and the input shaft 38 can be formed together as one piece or can be separate pieces that are connected together. The forward ring gear 50 includes a radially inwardly facing gear surface 52. The forward planetary gearset 42 also includes a forward sun gear 54 that is disposed on the output shaft 40. The forward sun gear 54 has a radially outwardly facing gear surface 56 and a radially inwardly facing bearing surface 58. The radially inwardly facing bearing surface 58 bears on the output shaft 40 such that the forward sun gear 54 is rotatable with respect to the output shaft 40, and vice verse. The type of bearing surface can vary and in this example includes roller bearings 59. The forward planetary gearset 42 further includes a forward brake drum 60 that rotates with the forward sun gear 54. The forward brake drum 60 can be formed as one component with the forward sun gear 54 or the forward brake drum 60 can be a separate component that is attached to the forward sun gear 54.

The forward planetary gearset 42 further includes a plurality of forward planet gears 62 that are rotatable about their own center axis 64 and that are radially disposed between the forward ring gear 50 and the forward sun gear 54. Each forward planet gear 62 has a radially outwardly facing gear surface 66 that is engaged with the radially inwardly facing gear surface 52 of the forward ring gear 50 and the radially outwardly facing gear surface 56 of the forward sun gear 54. The forward planetary gearset 42 further includes a forward carrier 68 that retains the plurality of forward planet gears 62 so that the forward planet gears 62 are rotatable about their own center axis 64. The forward carrier 68 is fixed to and rotates with the output shaft 40 and is rotatable with respect to the forward ring gear 50 and the forward sun gear 54. The manner of connection between the forward carrier 68 and the output shaft 40 can vary. In this example, a first plurality of splines 70 are formed on a radially inwardly facing surface 71 of the forward carrier 68 and engage with a second plurality of splines 72 on a radially outer surface 73 of the output shaft 40.

The reverse planetary gearset 44 includes a reverse sun gear 74 that is fixed to and rotates with the input shaft 38. The reverse sun gear 74 can be formed as one component with the input shaft 38 or formed separately from and connected to the input shaft 38. The reverse sun gear 74 has a radially outwardly facing gear surface 76. The reverse planetary gearset 44 also has a reverse ring gear 78 that is fixed to and rotates with the forward carrier 68. The reverse ring gear 78 and the forward carrier 68 can be formed as one component or separate components that are connected together. In this example, the reverse ring gear 78 has peripheral tabs 80 that are received in peripheral recesses 82 that are circumferentially spaced apart on the outer radius of the forward carrier 68. The reverse ring gear 78 includes a radially inwardly facing gear surface 84.

The reverse planetary gearset 44 further includes a plurality of reverse planet gears 86 that are rotatable about their own center axis 88 and that are radially disposed between the reverse ring gear 78 and the reverse sun gear 74. Each reverse planet gear 86 has a radially outwardly facing gear surface 90 that is engaged with the radially inwardly facing gear surface 84 of the reverse ring gear 78 and the radially outwardly facing gear surface 76 of the reverse sun gear 74. The reverse planetary gearset 44 also has a reverse carrier 92 that retains the reverse planet gears 86 so that the reverse planet gears 86 can rotate about their own center axis 88. The reverse carrier 92 is rotatable with respect to the reverse ring gear 78 and the reverse sun gear 74. A reverse brake drum 94 is fixed to and rotates with the reverse carrier 92. The reverse brake drum 94 and reverse carrier 92 can be formed as a single component or can be separate components that are connected together. Pluralities of bearings 97, 99 (see FIGS. 10-12), such as roller bearings, support the reverse planetary gearset 44 with respect to the output shaft 40.

Referring to FIGS. 7-9, the exact construction of the forward and reverse brakes 46, 48 can vary. In certain examples the forward and reverse brakes 46, 48 are conventional single-wrapped band brakes, as shown in FIG. 8. In certain examples the forward and reverse brakes 46, 48 are conventional double-wrapped band brakes, as shown in FIG. 9. The functionality of single-wrapped band brakes and double-wrapped band brakes generally is the same except the torque capability of the double-wrapped band brakes is higher than the single-wrapped band brakes for the same actuation force. In the example of FIGS. 2-6, the forward and reverse brakes 46, 48 are wrapped around and act on the forward and reverse brake drums 60, 94. Tightening the band brake prevents rotation of the brake drum. Loosening the band brake allows rotation of the brake drum. FIG. 7 depicts one example wherein the forward brake 46 is a double-wrapped band brake that is wrapped around the forward brake drum 60. The reverse brake 48 and reverse brake drum 94 can be configured in the same manner. An actuator 96 is configured to actuate the forward and reverse brakes 46, 48. The type of actuator can vary from that which is shown. In this example, the actuator 96 includes a servo-motor 98 that moves a pin 100 in the direction of arrow 102 against a bearing bracket 104 disposed at one end of the forward brake 46. The other end of the forward brake 46 is fixed to a gearcase housing 106. Movement of the pin 100 in the direction of arrow 102 tightens the forward brake 46 about the brake drum 60, thus preventing the brake drum 60 from rotating. In this example, the forward and reverse brakes 46, 48 are self-energized, which means that the direction of rotation of the forward and reverse brake drums 60, 94 (as shown at arrow 103) is the same as the direction of actuation shown at arrow 102. Thus, rotation of the brake drums 60, 94 assists actuation of the forward and reverse brakes 46, 48. Movement of the pin 100 opposite the direction of arrow 102 loosens the forward brake 46 with respect to the brake drum 60, thus allowing the brake drum 60 to rotate.

Figure 10:
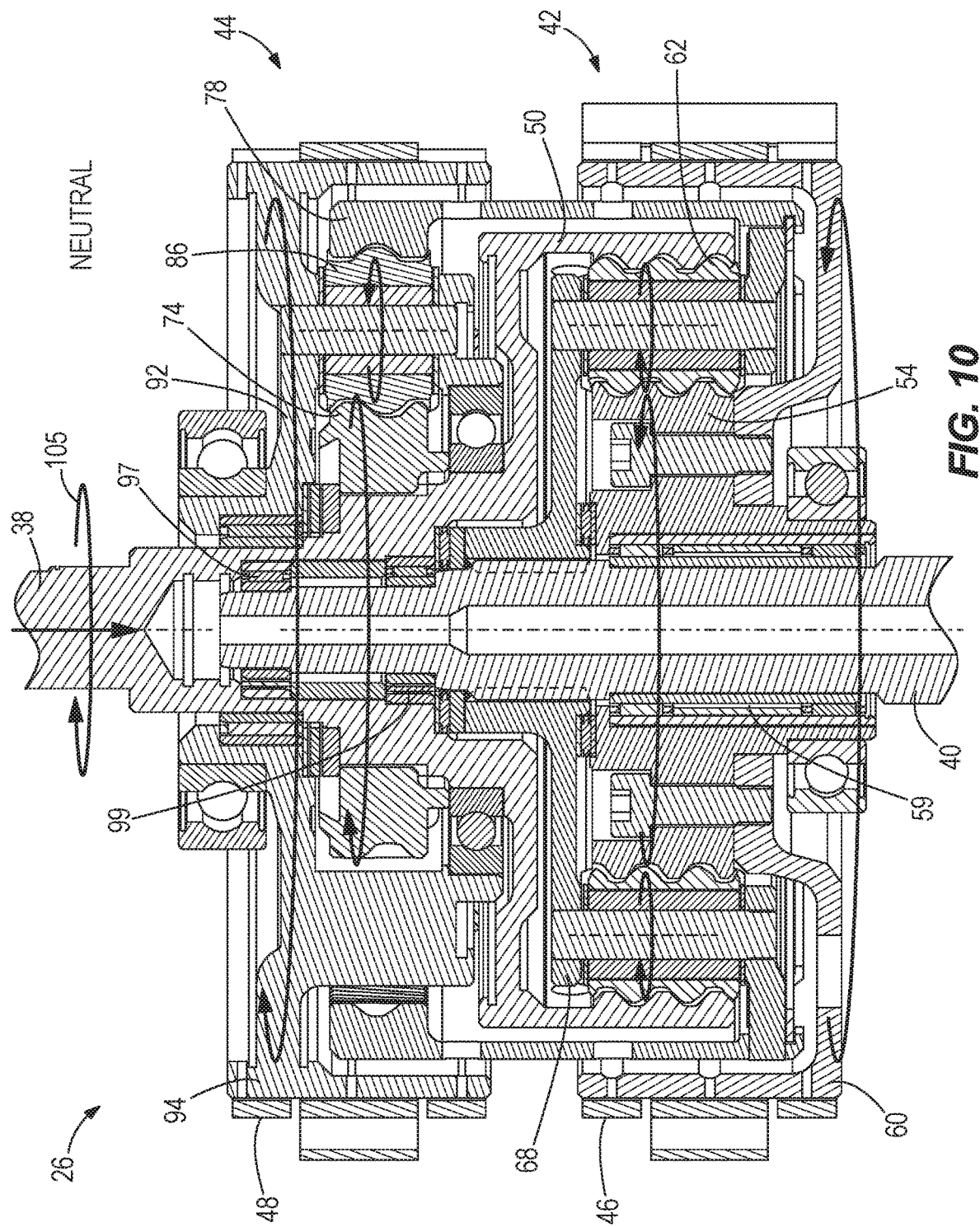
FIG. 10 is a view of section 10-10 taken in FIG. 2, showing the transmission in neutral gear.
Figure 11:
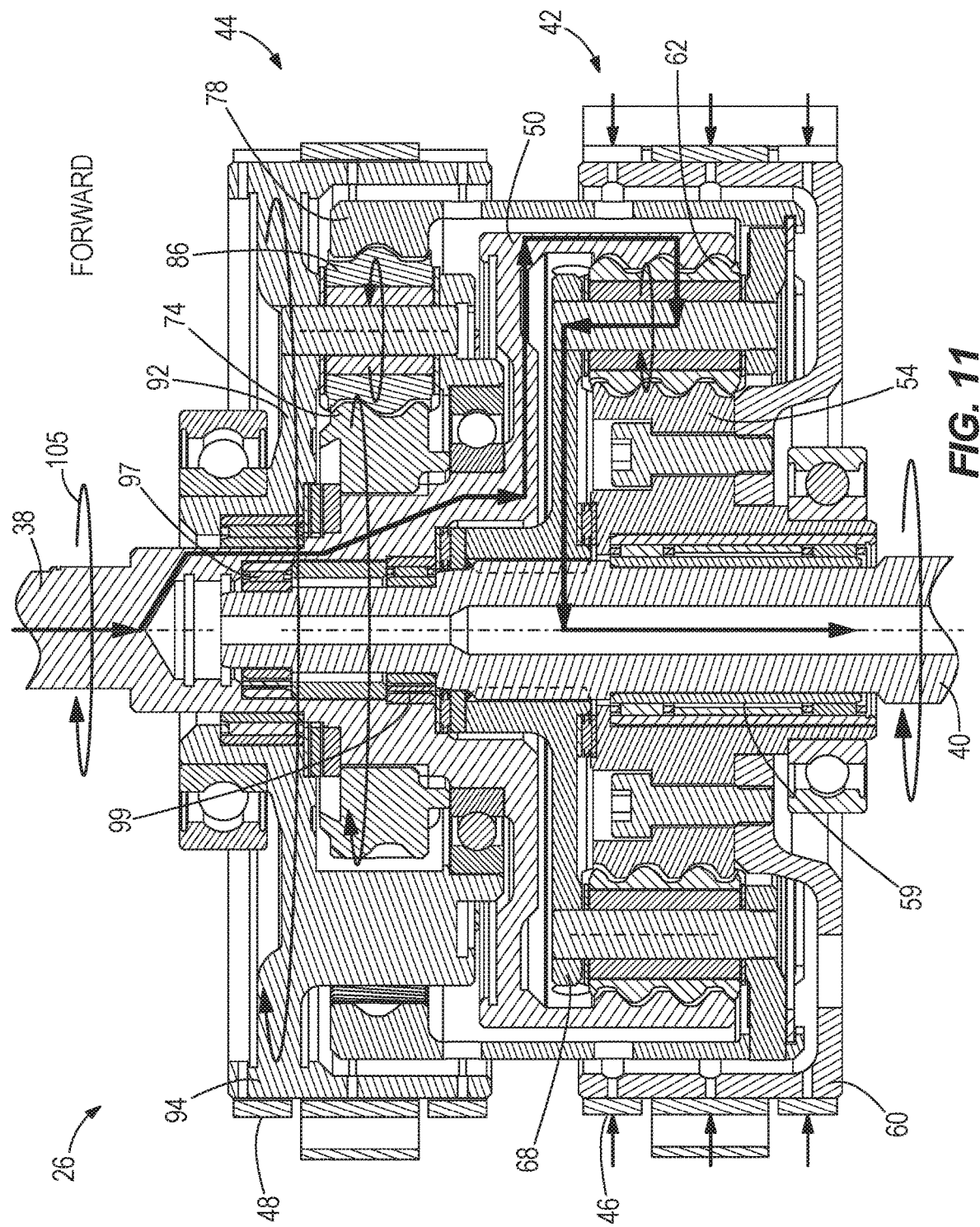
FIG. 11 is a view of section 10-10 taken in FIG. 2, showing the transmission in forward gear.
Figure 12:
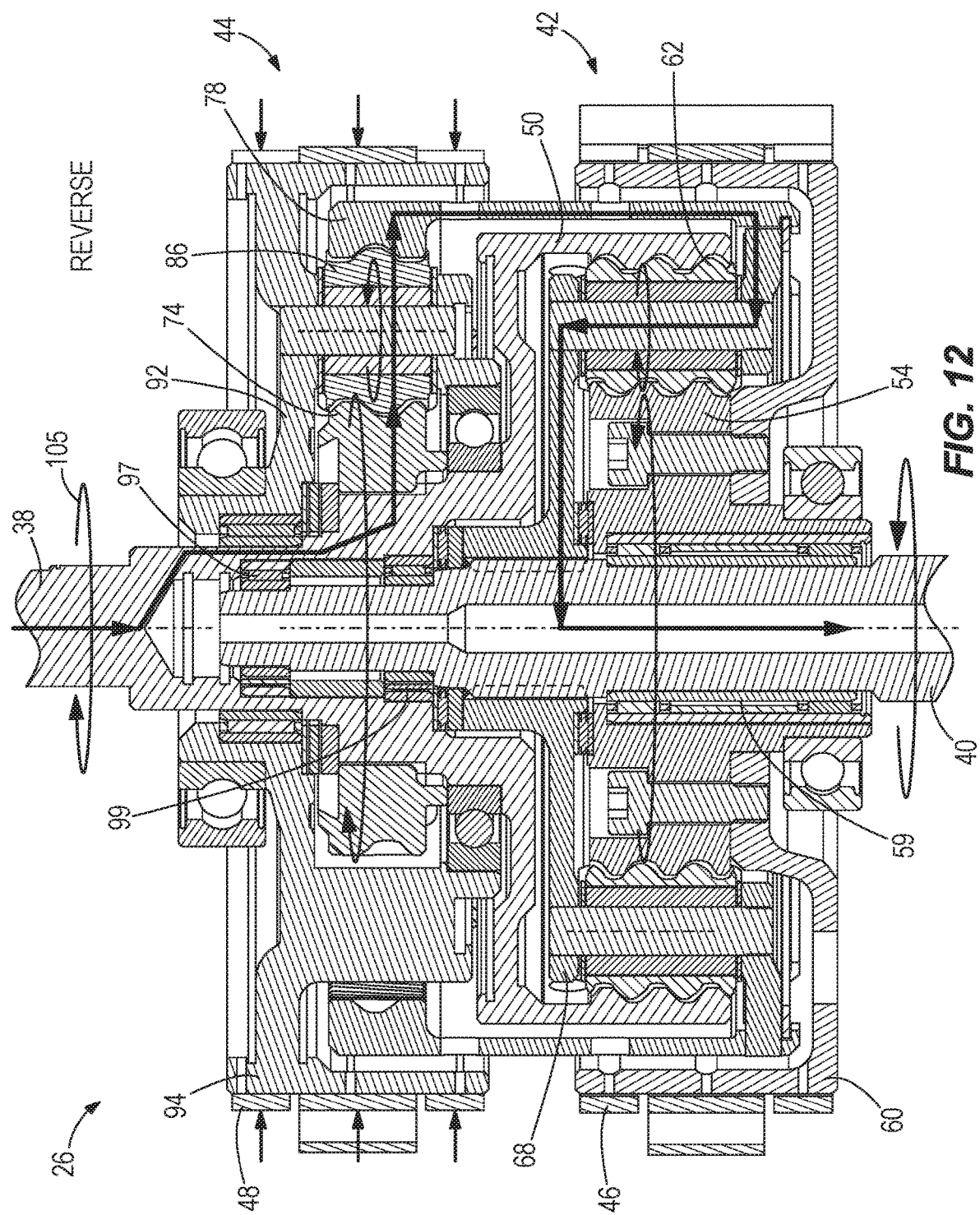
FIG. 12 is a view of section 10-10 taken in FIG. 2, showing the transmission in reverse gear.

Referring to FIGS. 10-12, the transmission 26 is able to engage the input shaft 38 with the output shaft 40 in neutral, forward and reverse gears. FIG. 10 shows the transmission 26 in neutral gear, wherein rotation of the input shaft 38 does not cause rotation of the output shaft 40. In the neutral gear, neither of the brakes 46, 48 are tightened about the brake drums 60, 94. That is, the actuator 96 has not moved the pin 100 in the direction of arrow 102. As such, both brake drums 60, 94 are free to rotate. Thus forward rotation of the input shaft 38 (shown at arrow 105) causes forward rotation of the reverse sun gear 74 and forward ring gear 50. The forward rotation of the reverse sun gear 74 causes reverse rotation of the reverse planet gears 86, which in turn causes forward rotation of the reverse carrier 92 and reverse brake drum 94. The forward rotation of the forward ring gear 50 causes reverse rotation of the forward planet gears 62, which causes reverse rotation of the forward brake drum 60. The forward carrier 68 and output shaft 40 remain stationary. The rotation of the input shaft 38 is not translated to the output shaft 40.

FIG. 11 depicts the transmission 26 in forward gear, wherein the forward brake 46 is actuated by the actuator 96 so as to move the pin 100 in the direction of arrow 102, which as described herein above, holds the forward brake drum 60 and forward sun gear 54 stationary. Forward rotation of the input shaft 38 (at 105) causes forward rotation of the forward ring gear 50, which in turn causes forward rotation of the plurality of forward planet gears 62 and forward rotation of the forward carrier 68 and output shaft 40. The forward rotation of the reverse sun gear 74 also results in reverse rotation of the plurality of reverse planet gears 86 and forward rotation of the reverse carrier 92 and reverse brake drum 94.

FIG. 12 shows the transmission 26 in reverse gear, wherein the actuator 96 moves the pin 100 in the direction of arrow 102, which as described herein above, holds the reverse brake drum 94 and reverse carrier 92 stationary. This prevents the plurality of reverse planet gears 86 from rotating about the reverse sun gear 74. Forward rotation of the input shaft 38 (at 105) causes forward rotation of the reverse sun gear 74, which causes reverse rotation of the plurality of reverse planet gears 86 about their own center axis 88, which causes reverse rotation of the reverse ring gear 78, which in turn causes reverse rotation of the forward carrier 68 and the output shaft 40.

Thus rotation of the input shaft 38 simultaneously directly powers both of the forward and reverse planetary gearsets 42, 44. More specifically, rotation of the input shaft 38 simultaneously, directly powers the forward planetary gearset 42 via the forward ring gear 50 and the reverse planetary gearset 44 via the reverse sun gear 74.

Figure 2:
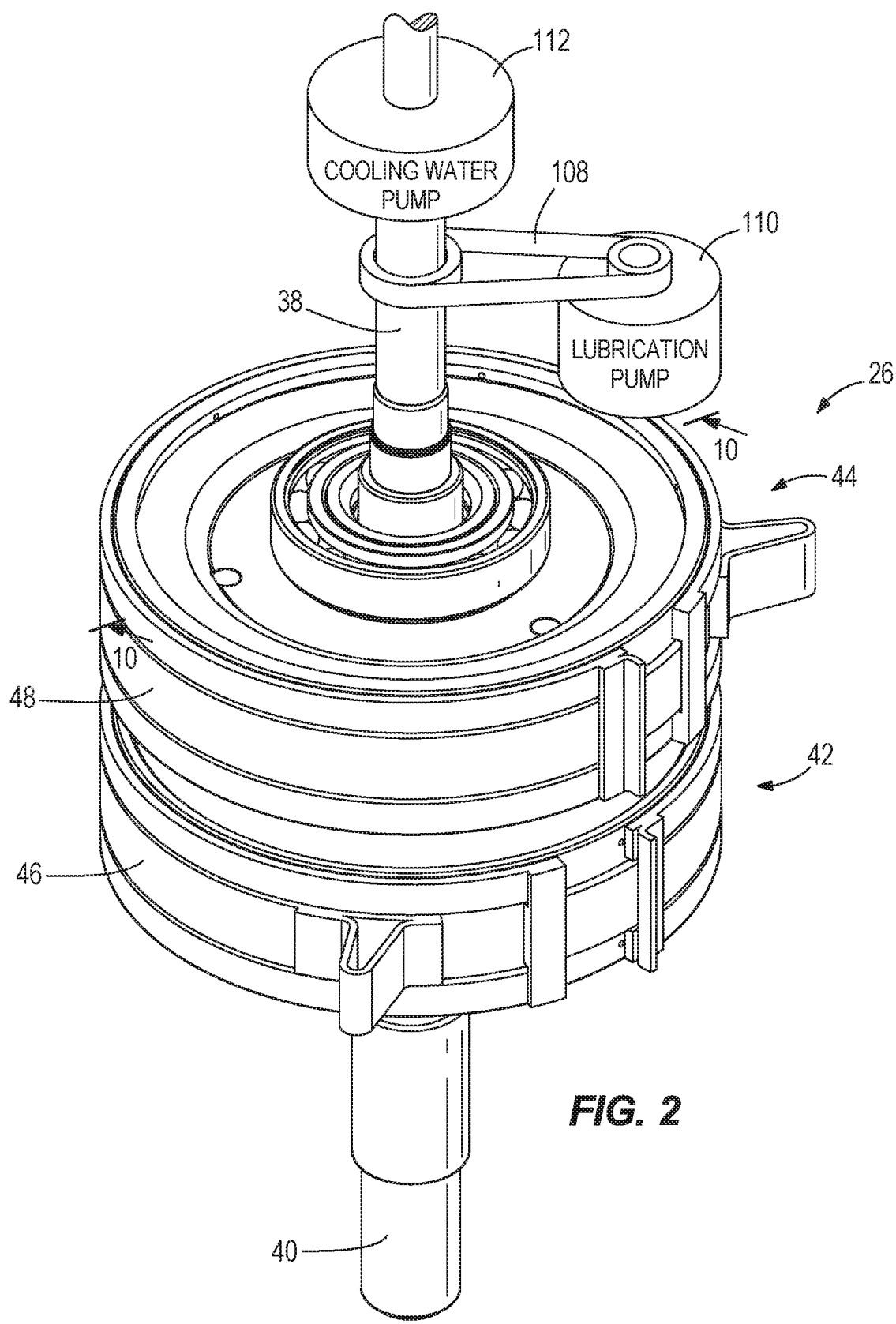
FIG. 2 is a perspective view of a transmission for the outboard marine propulsion device.
Figure 3:
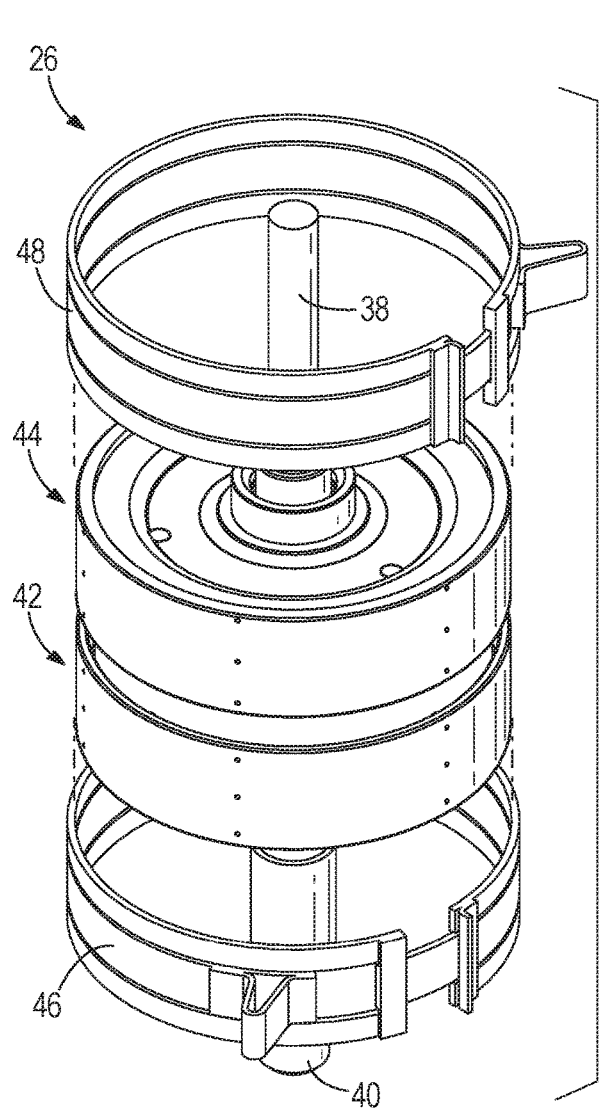
FIGS. 3-6 are exploded views of the transmission.
Figure 4:
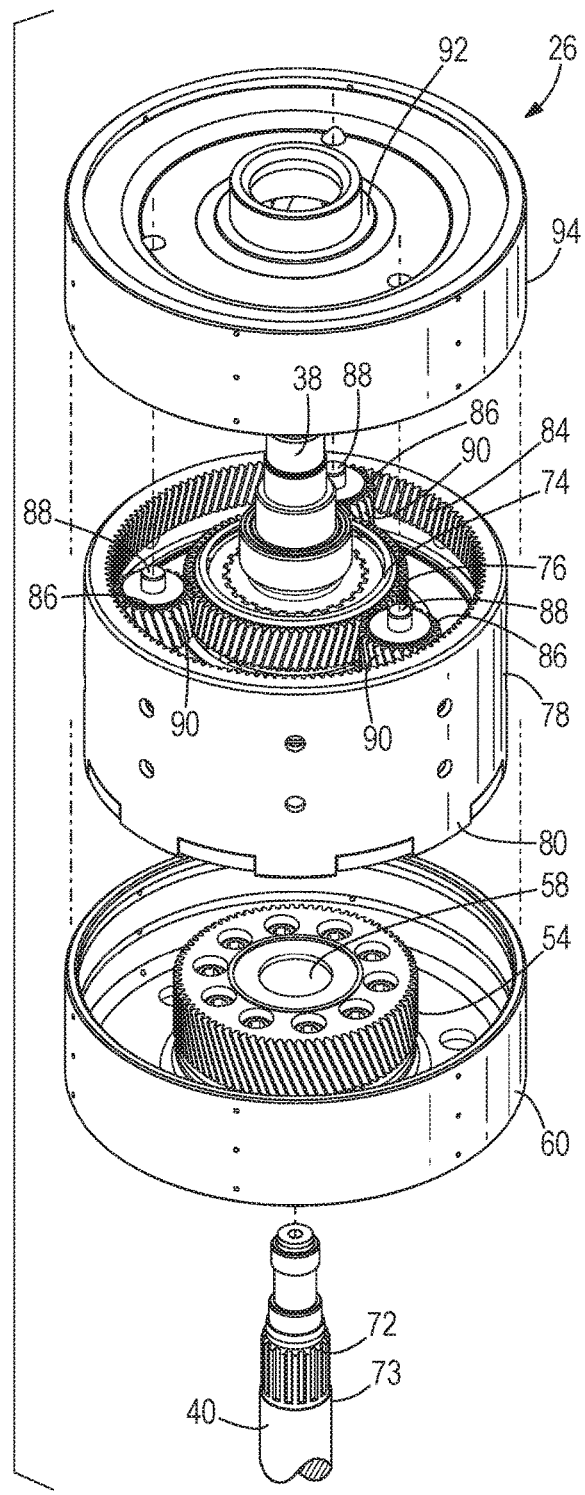
Figure 5:
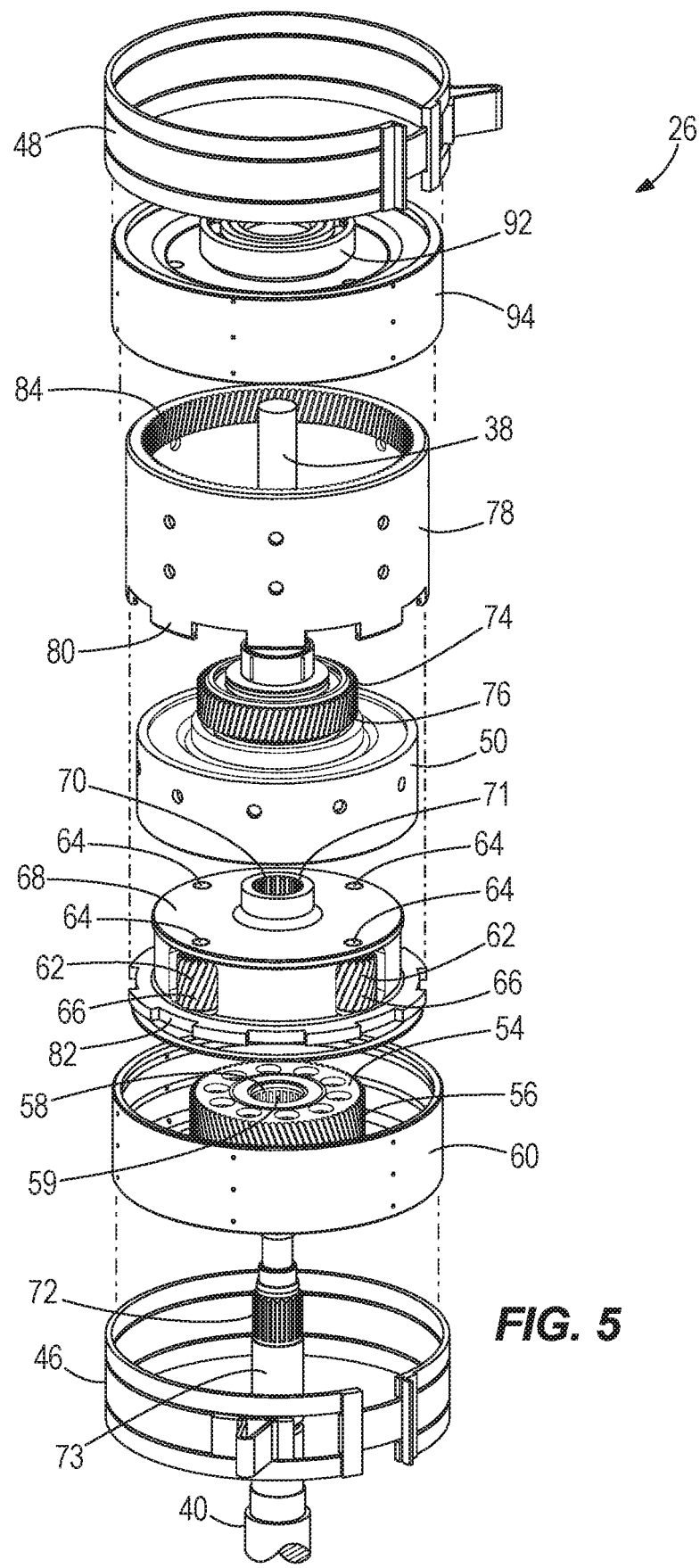
Figure 6:
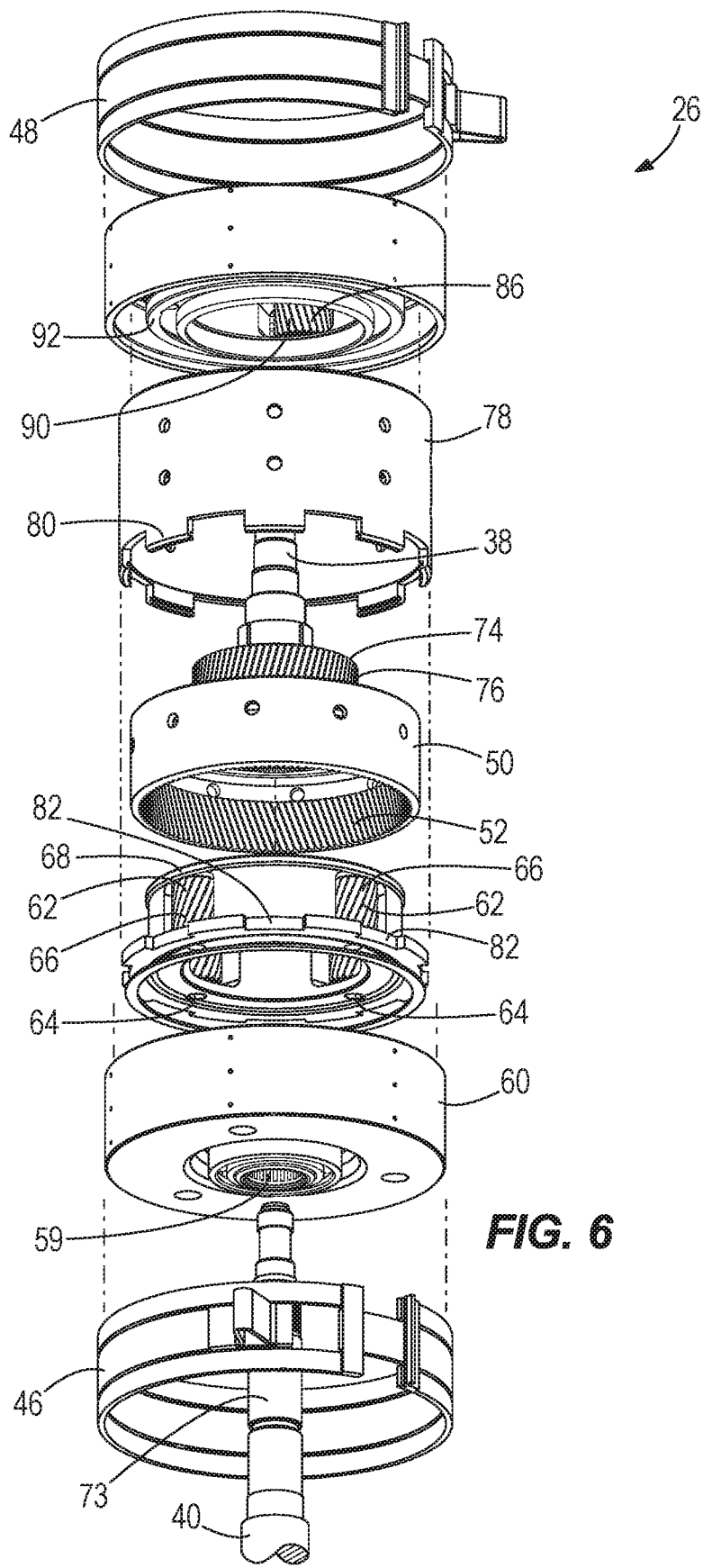

As shown in FIG. 2, a belt 108 connects the input shaft 38 to a lubrication pump 110 for providing lubrication, e.g. oil, to the transmission 26 and associated lower gearbox unit. Thus the lubrication pump 110 will operate any time that the engine 18 is operating. A cooling water pump 112 is directly connected to the input shaft 38 such that rotation of the input shaft 38 causes the cooling water pump 112 to pump cooling water to the engine 18. Thus the cooling water pump 112 will operate any time that the engine 18 is operating. Neither the lubrication pump 110 nor the cooling water pump 112 will change their operation based upon a change in gear implemented by the transmission 26.

The components of the transmission 26 can be made of various materials, including metal, including steel and for example cast iron, which dissipates heat.

Advantageously the transmission 26 can be configured to provide the same speed reduction in both forward and reverse gears, have a high power density compared to prior art.

Advantageously the transmission 26 can sustain specified torque input, speed, shift cycles and transient conditions such as wave jump, throttle chop, and/or the like and still be located between the driveshaft housing 24 and the gearcase housing 32, for example within a minimum axial length, while still maintaining a hydrodynamic gearcase shape that minimizes drag.

During continued research and development, the present inventors have realized that the transmission arrangements described herein above with reference to FIGS. 1-12 can be controlled to purposefully, gradually and/or partially and/or intermittently engage the respective band brakes 46, 48. By doing so, the harshness (often referred to in the art as "shift clunk") of the shift event can be softened, resulting in minimal noise and vibration being transferred to the boat hull as compared to typical outboard marine engine. The present inventors have also realized that the transmission arrangements described herein above uniquely can be controlled to purposefully create slip at the band brake-to-transmission drum interface. By doing so the speed of rotation of the output shaft 40 (which corresponds to the speed of rotation of the propulsor 34) can be reduced below that of the nominal speed determined by the transmission gear ratio. Advantageously, this provides the ability to achieve low speeds (such as trolling speeds) that are less than the speeds that are determined by the transmission gear ratio. This also advantageously facilitates easier docking maneuvers by allowing a slower approach and less abrupt movements of the vessel, as the operator toggles between forward, neutral and reverse gears to control the vessel speed. The present inventors have also realized that this advantageously facilitates tighter holding (i.e. improved maneuvering) to a geographical set point in stationkeeping modes, as compared to conventional control systems, which tend to overshoot set points. Based upon these realizations, the present inventors developed the following systems and methods for controlling transmissions on marine propulsion devices.

Figure 13:
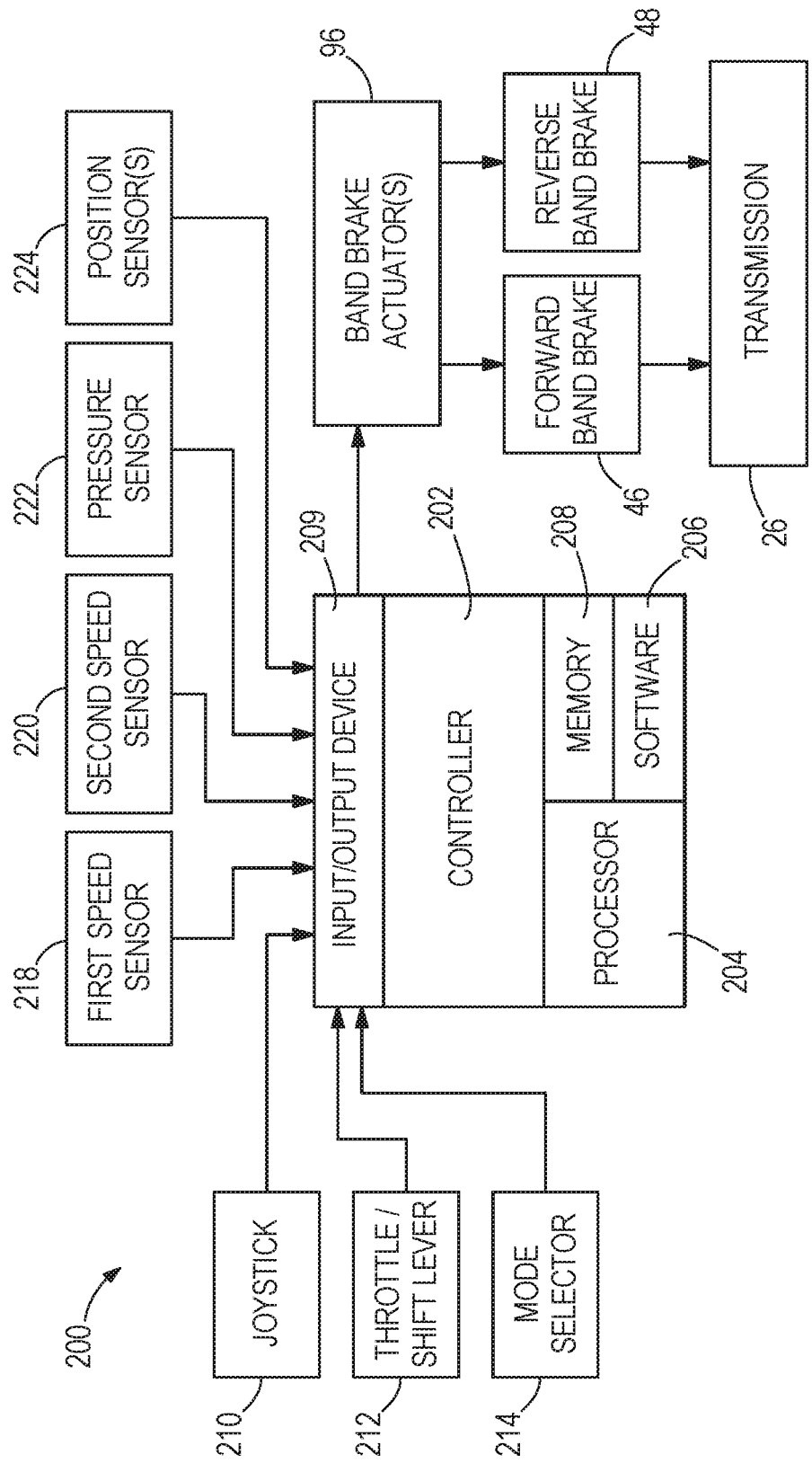
FIG. 13 is a diagram of an exemplary system according to the present disclosure.

FIG. 13 depicts one example a system 200 for controlling transmission activity of a marine propulsion device, such as the marine propulsion device 10 described herein above. The system 200 includes the above-described transmission 26 having the input shaft 38 that is driven into rotation by the internal combustion engine 18 and the output shaft 40 that drives the propulsor 34 into rotation. The transmission 26 also includes the above-described forward and reverse planetary gearsets 42, 44, which transfer power from the input shaft 38 to the output shaft 40. The forward and reverse band brakes 46, 48 are on the forward and reverse planetary gearsets 42, 44. As described herein above, actuation of each of the forward and reverse band brakes 46, 48 effects a gear change amongst forward and reverse gears and neutral. The system 200 also includes the noted shift actuator 96 (i.e. band brake actuator), which actuates the forward and reverse brakes 46, 48 to effect the noted gear change. The exact type of shift actuator 96 can include one or more conventional electric, mechanical and/or hydraulically actuated devices.

The system 200 includes a computer controller 202 that is programmed to control the shift actuator 96 to actuate the forward and reverse brakes 46, 48 according to the programming structure and methods described further herein below. The controller 202 is programmable and includes a computer processor 204, computer software 206, a memory (i.e. computer storage) 208, and one or more conventional computer input/output (interface) devices 209. The processor 204 loads and executes the software 206 from the memory 208. Executing the software 206 controls the system 200 to operate as described in further detail herein below. The processor 204 can comprise a microprocessor and/or other circuitry that receives and execute software 206 from memory 208. The processor 204 can be implemented within a single device, but it can also be distributed across multiple processing devices and/or subsystems that cooperate in executing program instructions. Examples include general purpose central processing units, application specific processors, and logic devices, as well as any other processing device, combinations of processing devices, and/or variations thereof. The controller 202 can be located anywhere with respect to the marine propulsion device 10 and marine vessel 12 and can communicate with various components of the system 200 via wired and/or wireless links. The controller 202 can have one or more microprocessors that are located together or remotely from each other in the system 200 or remotely from the system 200.

The memory 208 can include any storage media that is readable by the processor 204 and capable of storing the software 206. The memory 208 can include volatile and/or nonvolatile, removable and/or non-removable media implemented in any method or technology for storage of information, such as computer readable instructions, data structures, program modules, or other data. The memory 208 can be implemented as a single storage device but may also be implemented across multiple storage devices or subsystems. The memory 208 can further include additional elements, such as a controller that is capable of communicating with the processor 204. Examples of storage media include random access memory, read only memory, magnetic discs, optical discs, flash memory discs, virtual and/or non-virtual memory, magnetic cassettes, magnetic tape, magnetic disc storage, or other magnetic storage devices, or any other medium which can be used to store the desired information and that may be accessed by an instruction execution system, as well as any combination or variation thereof, or any other type of storage media. In some implementations, the storage media can be a non-transitory storage media.

The computer input/output devices 209 associated with the controller 202 can include any one of a variety of conventional computer input/output interfaces for receiving electrical signals for input to the processor and for sending electrical signals from the processor to various components of the system 200. The controller 202, via the noted computer input/output device 209, communicates with the band brake actuator 96 via one or more communication links, which as mentioned herein above can be wired or wireless links. As explained further herein below, the system 200 is capable of monitoring and controlling operational characteristics of the marine propulsion device 10 by sending and/or receiving control signals via one or more of the links shown in FIG. 13. Although the links are each shown as a single link, the term "link" can encompass one or a plurality of links that are each connected to one or more of the components of the system 200.

The system 200 can include one or more operator input devices for inputting operator commands to the controller 202. The operator input device(s) can include a joystick 210, throttle/shift lever 212, and/or a mode selector 214, which can include for example a push button, switch, touch screen, or other device for inputting an instruction signal to the controller 202 from the operator of the of system 200. In certain examples the operator input devices are operable to instruct the controller 202 to control the shift actuator 96 to thereby initiate an action of the forward brake 46 or reverse brake 48 for example to enact a gear change amongst forward, neutral and reverse gears, as described herein above. Such operator input devices for inputting operator commands to a controller are well known in the art and therefore for brevity are not further herein described.

The system 200 can include one or more sensor(s) that are configured to sense "operational characteristics" of the system 200 and associated marine propulsion device 10 and convey such information in the form of electrical signals to the controller 202. The type of operational characteristic can vary, and as explained further herein below can include actual speed of rotation of the input and/or output shafts 38, 40; hydraulic pressure associated with the shift actuator 96; position of the shift actuator 96 and/or band brakes 46, 48; an operational mode of the controller 202; an actual shift event; and/or the like.

In certain examples, the system 200 can include first and second speed sensors 218, 220 that are configured to directly or indirectly sense speed of rotation of the input shaft 38 and output shaft 40, respectively, and communicate this information to the controller 202. The type and location of the speed sensors 218, 220 can vary and in some examples are a Hall Effect or variable reluctance sensors located on or near the input and output shafts 38, 40. Speed sensors are known in the art and commercially available, for example, from CTS Corporation or Delphi. The type and configuration of speed sensor can vary.

In certain examples where the band brake actuator 96 is hydraulically-operated, the system 200 can include a pressure sensor 222 that is configured to sense the pressure of a hydraulic fluid that operates the band brake actuator 96 and then communicate this information to the controller 202. The type and location of such a pressure sensor 222 can vary and in some examples includes a conventional pressure transducer.

In certain examples, the system 200 can also include one or more position sensors 224 that are configured to sense the actual position of the shift actuator 96 and/or forward and/or reverse band brakes 46, 48 and communicate this information to the controller 202. The type of position sensor can 224 can vary and can include for example a conventional photoeye and/or a conventional pressure transducer.

Advantageously, as described further herein below with reference to FIGS. 14-22, based upon one or more operational characteristic of the marine propulsion device 10, the controller 202 is programmed to control the band brake actuator 96 so that the rotational speed of the output shaft 40 is less than the rotational speed of the input shaft 38 for a certain period of time, thus achieving the above-noted operational advantages of the system 200 over the prior art. The period of time can vary in duration based upon the particular operational characteristic of the marine propulsion device 10 and/or based upon the particular design of the system 200 and/or propulsion device 10. As stated above, the type(s) of operational characteristic upon which the controller 202 controls the forward and/or reverse band brakes 46, 48 to achieve the noted speed differential can vary. The manner in which the controller 202 controls the forward and/or reverse band brakes 46, 48 also can vary. Non-limiting examples of each are provided herein below.

Figure 14:
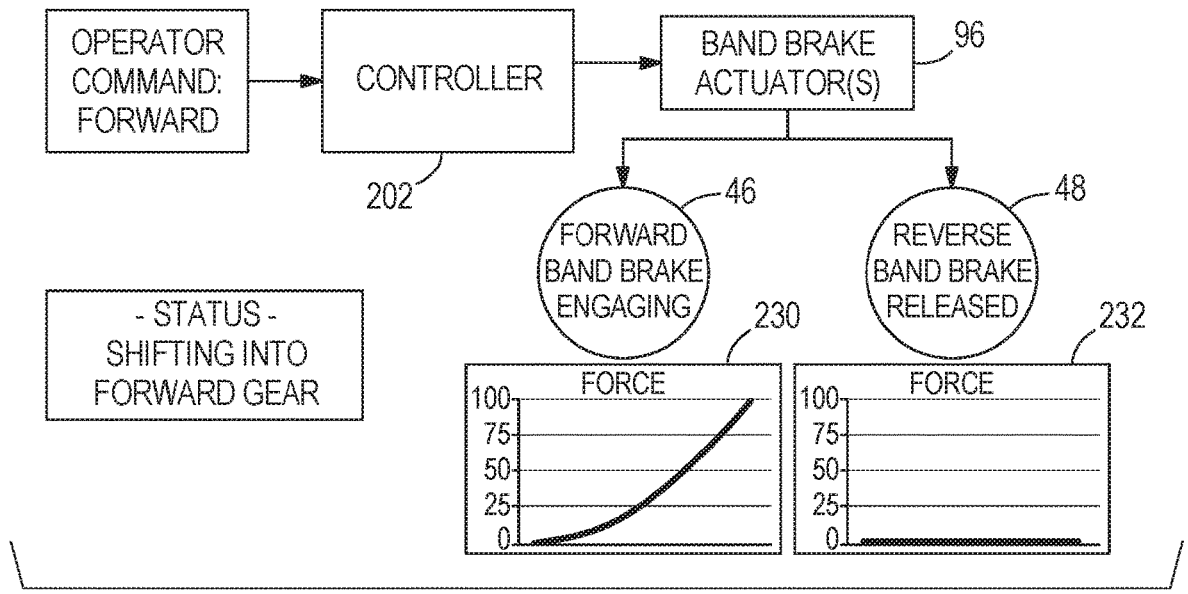
FIGS. 14-22 are schematic and graphical depictions showing operational modes of exemplary systems according to the present disclosure.
Figure 15:
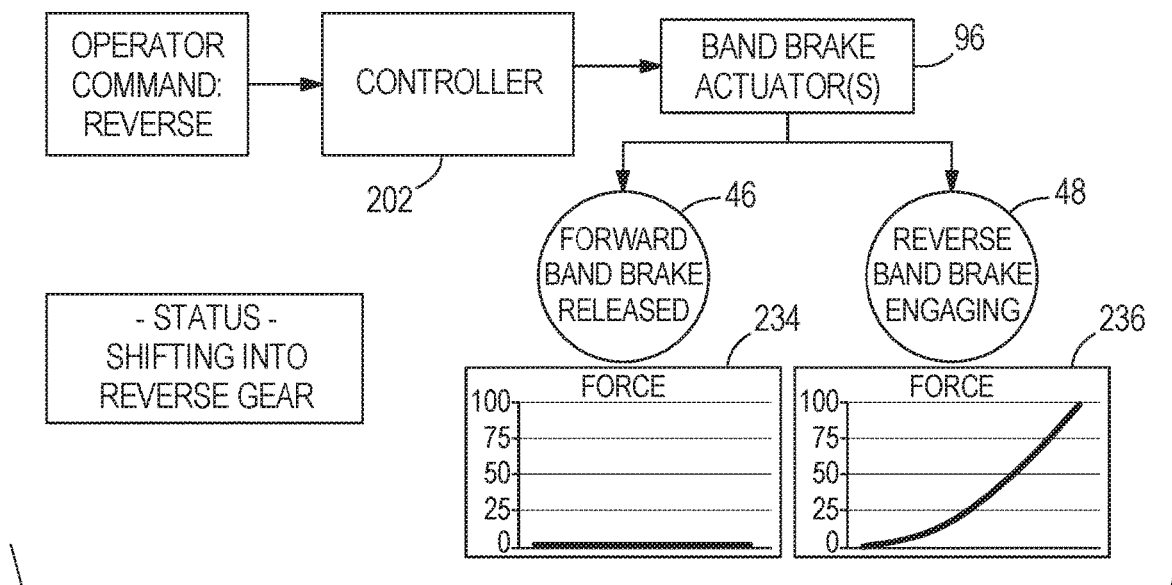
Figure 16:
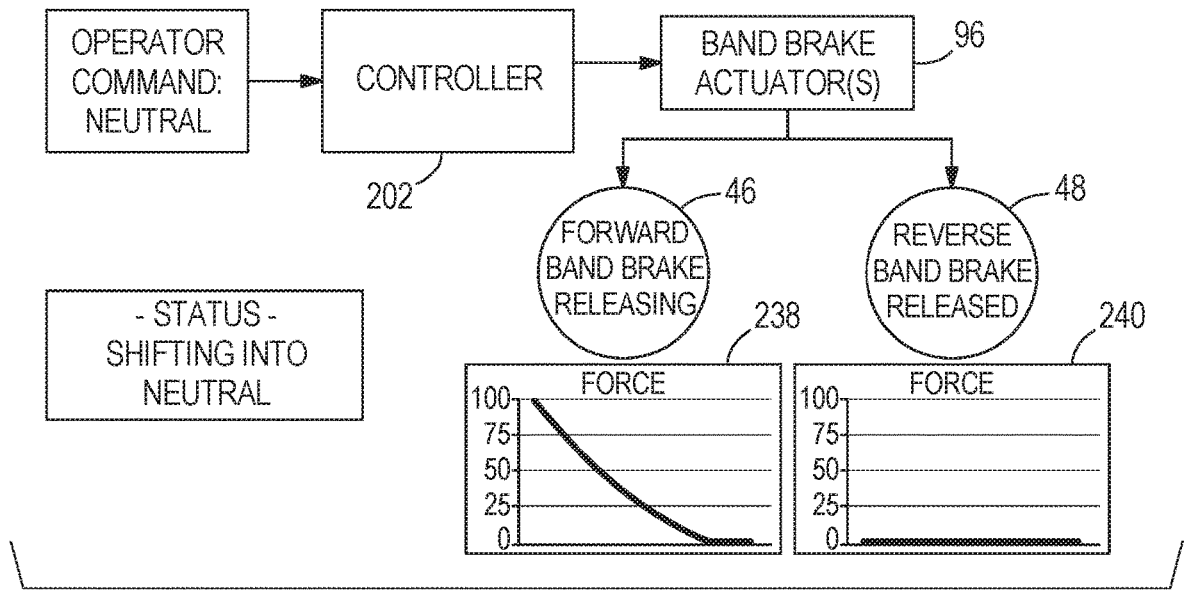

FIGS. 14-16 depict operational behavior of the system 200 during typical shifting amongst forward, reverse and neutral gears. FIG. 14 depicts the system 200 during a shift from neutral gear into forward gear. As shown at graph 230, the controller 202 controls the band brake actuator 96 to actuate the forward band brake 46 from zero to 100 percent output force on the forward planetary gearset 42. Simultaneously, as shown at graph 232, the controller 202 controls the band brake actuator 96 to cause the reverse band brake 44 to remain in the released state wherein zero percent output force is applied to the reverse planetary gearset 44. FIG. 15 depicts the system 200 during a shift from neutral gear into reverse gear. As shown at graph 236, the controller 202 controls the band brake actuator 96 to actuate the reverse band brake 48 from zero to 100 percent output force on the reverse planetary gearset 44. Simultaneously, as shown at graph 234, the controller 202 controls the band brake actuator 96 to cause the forward band brake 46 to remain in the released state wherein zero percent force is applied to the forward planetary gearset 42. FIG. 16 depicts the system 200 during a shift from forward gear into neutral gear. As shown at graph 238, the controller 202 causes the band brake actuator 96 to release the forward band brake 46 from 100 percent output force to zero output force on the forward planetary gearset 42. Simultaneously, as shown at graph 240, the controller 202 controls the band brake actuator 96 to cause the reverse band brake 48 to remain in the released state wherein zero output force is applied to the reverse planetary gearset 44. As would be understood by one having ordinary skill in the art, during a shift from reverse gear into neutral, the controller 202 causes the band brake actuator 96 to release the reverse band brake 48 from 100% output force to zero output force on the reverse planetary gearset 44. Simultaneously, the controller 202 controls the band brake actuator 96 to cause the forward band brake 46 to remain in the released state wherein zero output force is applied to the forward planetary gearset 42.

Figure 17:
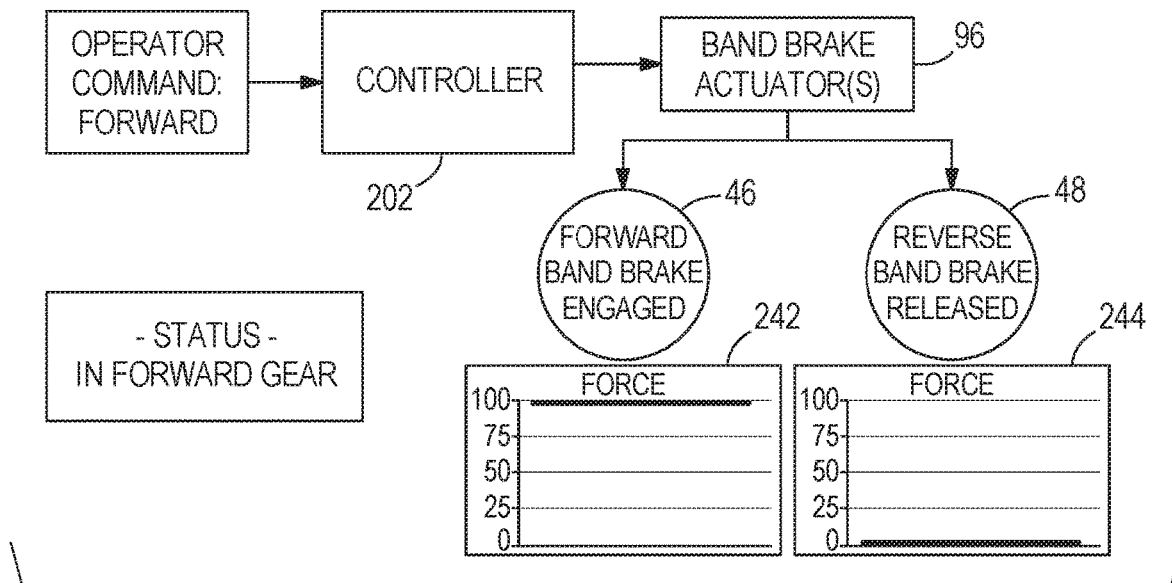
Figure 18:
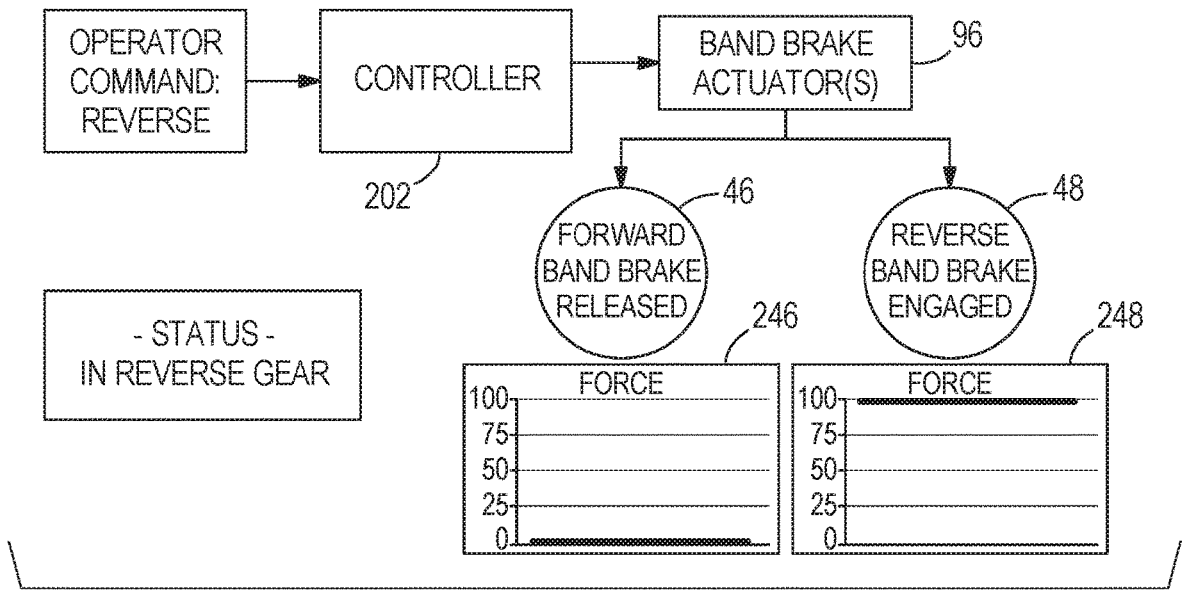
Figure 19:
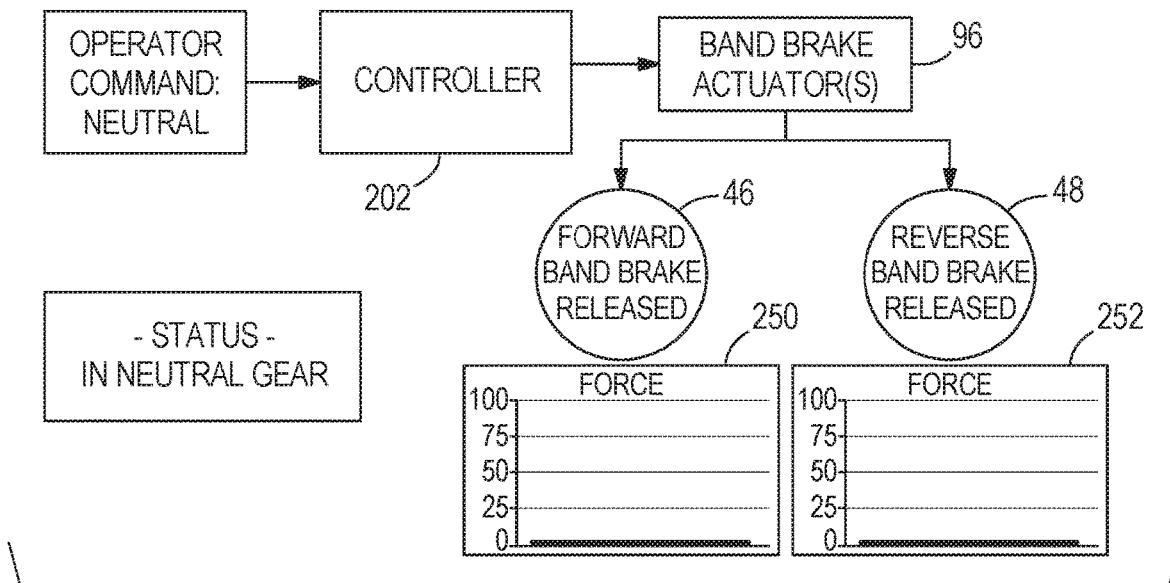

FIG. 17-19 depict operational behavior of the system 200 during typical in-gear, steady states. FIG. 17 depicts the system 200 during operation in forward gear. As shown at graphs 242 and 244, the controller 202 controls the band brake actuator 96 to fully engage the forward band brake 46 and to maintain the reverse band brake 48 in the released state. FIG. 18 depicts the system 200 during operation in reverse gear. As shown at graphs 246 and 248, the controller 202 controls the band brake actuator 96 to fully engage the reverse band brake 48 and to maintain the forward band brake 46 in the released state. FIG. 19 depicts the system 200 during operation in neutral gear. As shown at graphs 250 and 252, the controller 202 controls the band brake actuator 96 to maintain the forward band brake 46 and the reverse band brake 48 in the released state.

Figure 20:
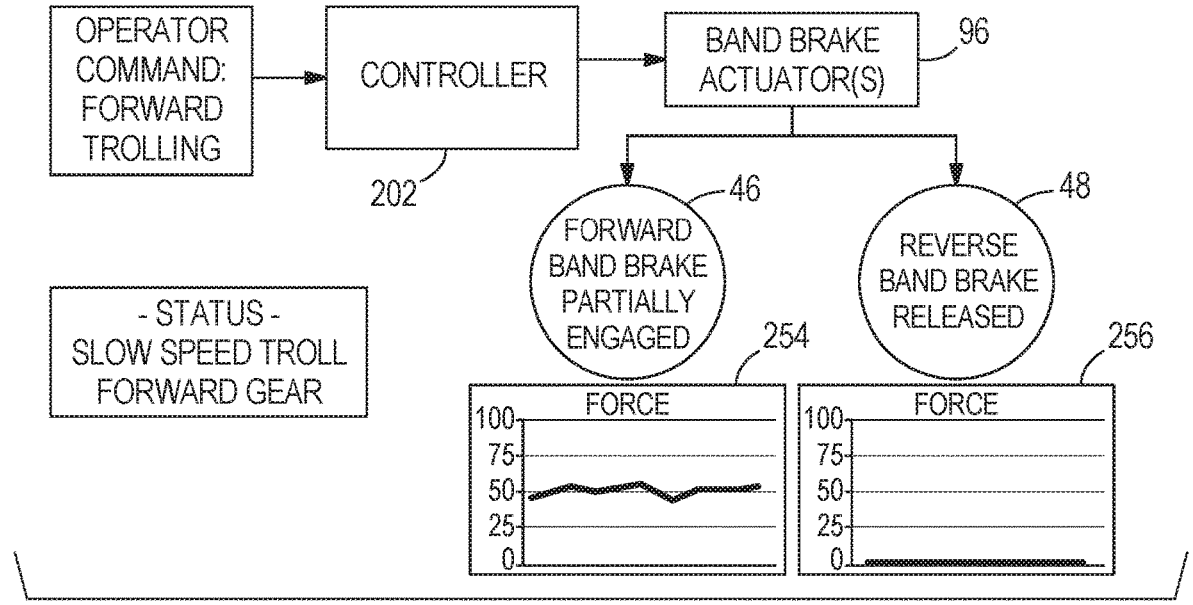

FIG. 20 depicts the system 200 during a "trolling mode" of the marine propulsion device 10 in forward gear, for example upon a request via one or more of the operator input devices. "Trolling mode" is a term of art that is used to describe a mode wherein the marine propulsion device is operated at a consistent, relatively low speed. Marine propulsion devices that control marine propulsion devices in trolling mode are well defined in the prior art, including for example the incorporated publications that are listed in the Background section of the present disclosure. Thus the term "trolling mode" is not further described herein for brevity sake. In certain examples according to the present disclosure, upon the request for trolling mode, the controller 202 is programmed to control the band brake actuator 96 to gradually actuate the forward band brake 46 so that the band brake 46 is partially engaged with the planetary gearset 42 and, as a result, the noted second rotational speed of the output shaft 40 is maintained at a speed that is less than the nominal output speed. Nominal rotational speed for output shaft 40 is rotational speed of input shaft 38 multiplied by the forward planetary gearset 42 gear ratio. With only partial engagement of band brake 46, the resultant rotational output speed is less than nominal. This is graphically shown by comparison of graphs 254 and 256. Gradual engagement of the forward band brake 46 with the forward brake drum results in continual slip between the band brake and the brake drum (i.e. the band brake slips on the brake drum as the brake drum rotates). This slippage causes the rotational speed of the output shaft 40 to be maintained at a speed that is less than the nominal.

In certain examples, the controller 202 can be configured to control the band brake actuator 96 so that the noted rotational speed of the output shaft 40 is less than the rotational speed of the input shaft 38 by a certain amount, which can be stored in the memory 208. For example, the controller 202 can be programmed to control the force applied by band brake actuator 96 to the forward band brake 46 based upon how the speed of the input shaft 38 compares to the speed of the output shaft 40. If a larger speed differential between the input shaft 38 and the output shaft 40 is desired, the controller 202 can be programmed to decrease the force applied by the band brake actuator 96 on the forward band brake 46. If a smaller differential is desired, the controller 202 can be programmed to increase the force applied by the band brake actuator 96 on the forward band brake 46. As described above, the speed sensors 218, 220 provide the controller 202 with the respective actual speeds of rotation of the input and output shafts 38, 40.

Figure 21:
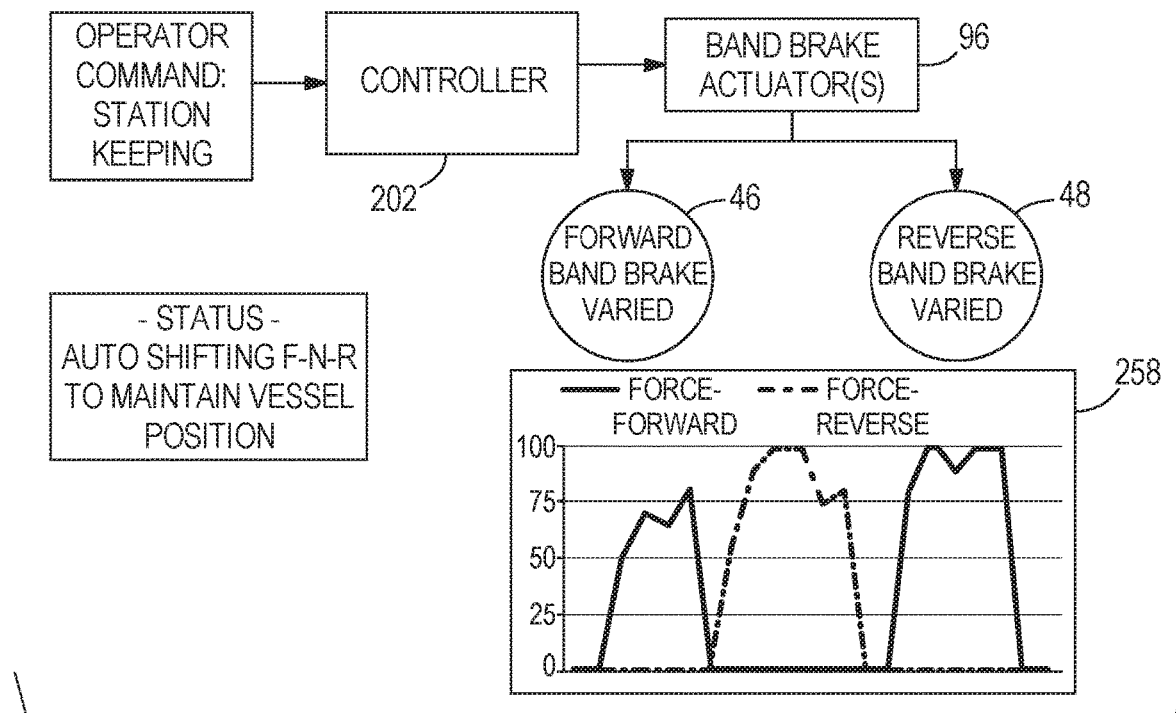

FIG. 21 depicts the system 200 upon a request for "stationkeeping" of the marine propulsion device 10, via for example one or more of the noted operator input devices. "Stationkeeping" is a term of art that represents a mode of control of the marine propulsion device wherein the marine vessel is maintained at defined geographical position. Marine propulsion systems that perform stationkeeping functionality are well known in the prior art, including for example the incorporated publications listed in the Background section of the present disclosure. Thus the term "stationkeeping" is not further described herein for brevity. In certain examples according to the present disclosure, upon an operator request for stationkeeping mode, the controller 202 is programmed to control the band brake actuator 96, as shown at graph 258, to independently and gradually engage either and/or both of the forward band brake 46 and reverse band brake 48 simultaneously or and/or separately so as to provide better transition amongst forward, neutral and reverse gears and to quickly achieve and maintain rotational speeds of the output shaft 40 that are less than the minimum speed provided by the gear ratio of the transmission 26.

Figure 22:
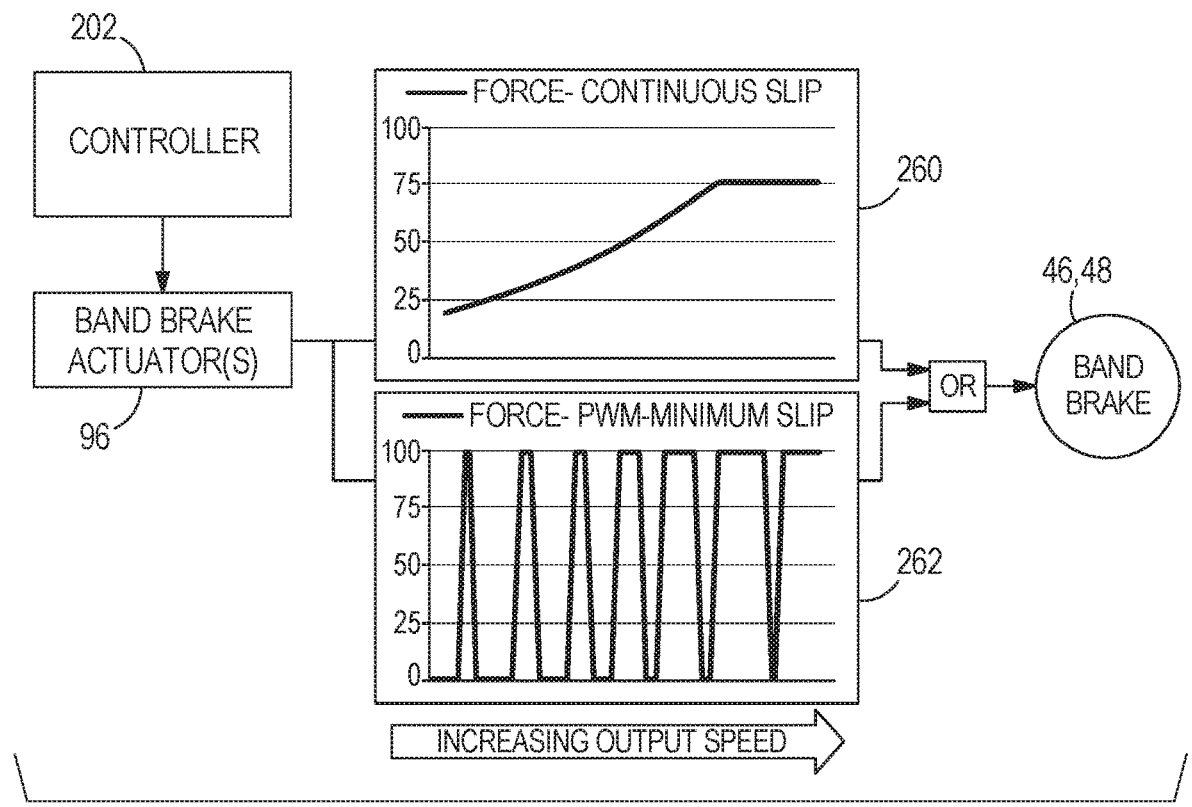

FIG. 22 depicts one example of the system 200 during a shifting event. In this example, the controller 202 is programmed to control the band brake actuator 96 to reduce overall vessel speed and mitigate harshness during shifting and maneuvering. As shown at graph 260, the controller 202 is programmed to control the band brake actuator 96 to continuously slip the interface between the band brake 46, 48 and the respective drum 60, 94. In another example, shown at graph 262, the controller 202 is configured to control the band brake actuator 96 to actuate in a plurality of pulses that alternate between full engagement with the band brake 46, 48 and full disengagement with the planetary gearsets 42, 44 so that the noted rotational speed of the output shaft 40 is less than the rotational speed of the input shaft 38. As shown in FIG. 22, the width of the pulses varies over time. In certain examples the width of the pulses can increase over time, thus providing a gradual increase in the rotational speed of the output shaft 40. Providing high frequency, relatively short duration full engagement events can achieve the same overall vessel movement as providing continuous slip. This advantageously can minimize slip and thus heat input to the brake band to brake drum interface. Both of these methods can reduce overall vessel speed and mitigate harshness during shifting and maneuvering.

Figure 23:
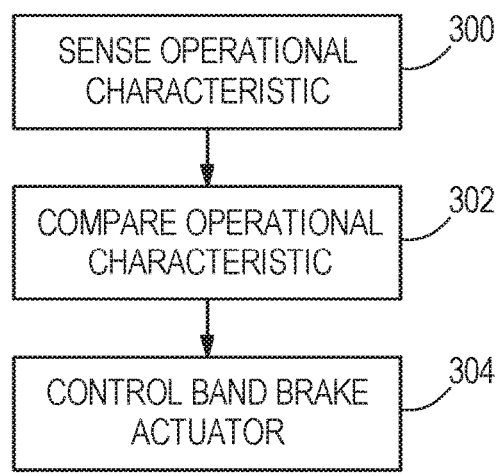
FIG. 23 is a flow chart of an exemplary method according to the present disclosure.

FIG. 23 is one example of a flow chart depicting a method according to the present disclosure for controlling a transmission system 200 for a marine propulsion device 10 having an internal combustion engine 18 that drives a propulsor 34. At step 300, the system 200 via for example any one or more of sensors 218, 220, 222, 224, senses an operational characteristic of marine propulsion device 10 and/or related system 200. At step 302, the controller 202 compares the operational characteristic to one or more values stored in the memory 208. Based upon this comparison, at step 304, the controller 202 is programmed to control the band brake actuator 96 in accordance with any one or more of the above-described embodiments.

The present disclosure thus provides transmission systems and methods for marine propulsion devices having an internal combustion engine that drives a propulsor. In certain examples, the transmission system comprises: an input shaft that is driven into rotation at a non-zero first rotational speed by the internal combustion engine; an output shaft that drives the propulsor into rotation at a non-zero second rotational speed; a planetary gearset that transfers power from the input shaft to the output shaft; a band brake on the planetary gearset, wherein actuation of the band brake effects a gear change in the planetary gearset; a band brake actuator that actuates the band brake to effect the gear change; and a controller that controls the band brake actuator, wherein based upon at least one operational characteristic of the marine propulsion device the controller is programmed to control the band brake actuator so that the second rotational speed is less than the first rotational speed. In certain examples, based upon the operational characteristic of the marine propulsion device, the controller is programmed to control the band brake actuator to gradually actuate the band brake so that the second rotational speed is less than the first rotational speed. In certain examples, based upon the operational characteristic of the marine propulsion device the controller is programmed to control the band brake actuator to gradually actuate the band brake so that a slip condition exists between the band brake and the planetary gearset which causes the second rotational speed to be less than the first rotational speed. In certain examples, based upon the operational characteristic of the marine propulsion device the controller is programmed to control the band brake actuator so as to actuate the band brake in a plurality of pulses that alternates between full engagement of the band brake with the planetary gearset and full disengagement of the band brake with the planetary gearset which causes the second rotational speed to be less than the first rotational speed. In certain examples, pulses in the plurality of pulses have different lengths. In certain examples, the different lengths of the pulses in the plurality of pulses increase over time. The operational characteristic can comprise an input to the controller of an operator request for a trolling mode of the marine propulsion device, an input to the controller of an operator request for stationkeeping mode of the marine propulsion device, and/or a gear change in the planetary gearset.

In certain examples a first speed sensor senses and communicates the first rotational speed of the input shaft to the controller and a second speed sensor that senses and communicates the second rotational speed of the output shaft to the controller. The controller can be programmed to control the band brake actuator so that the second rotational speed is less than the first rotational speed by a predetermined differential amount stored in a memory of the controller.

In certain examples the band brake actuator is hydraulically actuated, and the system further comprises a pressure sensor that senses actual hydraulic pressure associated with the band brake actuator. The controller can be programmed to control the band brake actuator based upon how the actual hydraulic pressure compares to a predetermined hydraulic pressure criteria stored in a memory of the controller.

The system can include a position sensor that senses an actual position of the band brake. The controller can be programmed to control the band brake actuator based upon how the actual position of the band brake compares to a predetermined positional criteria stored in a memory of the controller.

Advantageously the systems and methods herein disclosed can be implemented with a single level planetary device instead of the dual level planetary device shown in FIGS. 2-13.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The invention claimed is:

1. A marine propulsion device comprising:
   an engine configured to cause an input shaft to forwardly rotate at a non-zero first rotational speed;
   an output shaft coupled to a propulsor so that rotation of the output shaft causes rotation of the propulsor;
   a planetary gearset coupling the input shaft to the output shaft;
   a band brake actuator configured to actuate a band brake on the planetary gearset, wherein the band brake actuator is configured to apply a full force engagement of the band brake on the planetary gearset and alternately to apply a less than full force engagement of the band brake on the planetary gearset;
   wherein the full force engagement of the band brake on the planetary gearset causes a gear change into at least one of a forward gear in which forward rotation of the input shaft causes forward rotation of the output shaft, a reverse gear in which forward rotation of the input shaft causes reverse rotation of the output shaft, and a neutral gear in which rotation of the input shaft does not cause rotation of the output shaft; and
   wherein the less than full force engagement of the band brake on the planetary gearset causes slip to occur between the band brake and the planetary gearset, without causing the gear change; and further wherein the slip causes the output shaft to rotate at a non-zero second rotational speed that is less than a minimum nominal rotational speed that would otherwise result based on a transmission gear ratio of the planetary gearset; and
   a controller configured to control the band brake actuator according to a trolling mode by applying the less than full force engagement of the band brake on the planetary gearset, thereby causing the slip to occur, which in turn causes the propulsor to propel the marine vessel in trolling mode at a reduced speed.

2. The marine propulsion device according to claim 1, wherein the band brake actuator is hydraulically-actuated, and further comprising a pressure sensor configured to sense an actual hydraulic pressure associated with the band brake actuator, and wherein the controller is configured to control the band brake actuator based upon how the actual hydraulic pressure compares to an amount stored in a memory of the controller.

3. The marine propulsion device according to claim 1, further comprising a position sensor configured to sense an actual position of the band brake, wherein the controller is configured to control the band brake actuator to achieve the non-zero second rotational speed based upon how the actual position of the band brake compares to a value stored in a memory of the controller.

4. The marine propulsion device according to claim 1, the controller is configured to control the band brake actuator to gradually actuate the band brake from a zero force engagement of the band brake on the planetary gearset up to the full force engagement of the band brake on the planetary gearset.

5. The marine propulsion device according to claim 1, wherein the controller is configured to control the band brake so that the non-zero second rotational speed is less than the non-zero first rotational speed by an amount stored in a memory of the controller.

6. The marine propulsion device according to claim 1, wherein the controller is configured to control the band brake actuator to apply from zero to one hundred percent output force on the band brake, and wherein in the trolling mode the controller controls the band brake actuator to maintain more than zero output force on the band brake but less than one hundred percent output force on the band brake.

7. The marine propulsion device according to claim 1, further comprising a first speed sensor configured to sense and communicate the non-zero first rotational speed of the input shaft to the controller and a second speed sensor configured to sense and communicate the non-zero second rotational speed of the output shaft to the controller, wherein the controller is configured to control the band brake actuator based upon inputs from the first and second speed sensors.

8. The marine propulsion device according to claim 7, wherein the controller is configured to control the band brake actuator so that the non-zero second rotational speed remains less than the non-zero first rotational speed by an amount stored in a memory of the controller.

9. A method of controlling a transmission in a marine propulsion device, the method comprising:

providing an engine configured to cause forward rotation of an input shaft at a non-zero first rotational speed;

providing a planetary gearset that couples the input shaft to an output shaft such that rotation of the input shaft causes rotation of the output shaft, which in turn causes rotation of a propulsor;

selecting a trolling mode of a controller configured to control a band brake actuator on the planetary gearset, which in turn actuates the band brake at less than full force so that slip occurs between the band brake and the planetary gearset, without causing a gear change, wherein the slip causes the output shaft to rotate at a non-zero second rotational speed that is less than a minimum nominal rotational speed that would otherwise result based on a transmission gear ratio of the planetary gearset;

wherein actuation of the band brake at less than full force causes the output shaft to rotate at the non-zero second rotational speed and thus causes the propulsor to propel the marine vessel in trolling mode at a reduced speed.

10. The method according to claim 9, wherein the controller is configured to initially actuate the band brake actuator in trolling mode by gradually increasing the band brake from a zero force engagement on the planetary gearset to a less-than-full force engagement of the band brake on the planetary gearset.

* * * * *